United States Patent
Seal et al.

(10) Patent No.: US 6,521,296 B1
(45) Date of Patent: Feb. 18, 2003

(54) HIGH PERFORMANCE STRUCTURAL LAMINATE COMPOSITE MATERIAL FOR USE TO 1000° F. AND ABOVE, APPARATUS FOR AND METHOD OF MANUFACTURING SAME, AND ARTICLES MADE WITH SAME

(75) Inventors: Ellis C. Seal, Bay St. Louis, MS (US); Robert William Biggs, Jr., Pearl River, LA (US); Venu Prasad Bodepudi, New Orleans, LA (US); John A. Cranston, Huntsville, AL (US)

(73) Assignee: Lockheed Martin Corporation, New Orleans, LA (US)

( * ) Notice: Subject to any disclaimer, the term of this patent is extended or adjusted under 35 U.S.C. 154(b) by 798 days.

(21) Appl. No.: 09/211,473

(22) Filed: Dec. 14, 1998

Related U.S. Application Data

(62) Division of application No. 08/550,896, filed on Oct. 31, 1995, now Pat. No. 6,013,361.

(51) Int. Cl.[7] .................................. B05D 3/02
(52) U.S. Cl. ................. 427/294; 427/350; 427/385.5; 427/374.1; 427/374.2; 427/379; 427/434.6; 264/571; 264/257
(58) Field of Search ................. 427/221, 294, 427/350, 385.5, 374.1, 374.2, 434.6, 379; 118/50, 50.1; 264/571, 511, 257, 258; 428/408

(56) References Cited

U.S. PATENT DOCUMENTS

| | | | | |
|---|---|---|---|---|
| 3,724,386 A | | 4/1973 | Schmidt ................. 102/105 |
| 4,100,322 A | * | 7/1978 | Seibold et al. ........... 428/257 |
| 4,215,161 A | | 7/1980 | Seibold et al. ........... 427/228 |
| 4,659,624 A | * | 4/1987 | Yeager et al. ............ 428/408 |
| 4,919,739 A | * | 4/1990 | Dyksterhouse et al. ..... 156/181 |
| 4,942,013 A | * | 7/1990 | Palmer et al. ............ 264/511 |
| 4,957,801 A | | 9/1990 | Maranci et al. .......... 428/147 |
| 5,106,568 A | * | 4/1992 | Honka et al. ............ 264/510 |
| 5,288,547 A | | 2/1994 | Elmes et al. ............. 428/308 |
| 5,359,850 A | | 11/1994 | Prescott ................... 60/271 |
| 5,360,500 A | | 11/1994 | Evans et al. .............. 156/74 |

* cited by examiner

Primary Examiner—Michael Barr
(74) Attorney, Agent, or Firm—Garvey, Smith, Nehrbass & Doody, L.L.C.; Charles C. Garvey; Seth M. Nehrbass

(57) ABSTRACT

A novel materials technology has been developed and demonstrated for providing a high modulus composite material for use to 1000° F. and above. This material can be produced at 5–20% of the cost of refractory materials, and has higher structural properties. This technology successfully resolves the problem of "thermal shock" or "ply lift," which limits traditional high temperature laminates (such as graphite/polyimide and graphite/phenolic) to temperatures of 550–650° F. in thicker (0.25" and above) laminates. The technology disclosed herein is an enabling technology for the nose for the External Tank (ET) of the Space Shuttle, and has been shown to be capable of withstanding the severe environments encountered by the nose cone through wind tunnel testing, high temperature subcomponent testing, and full scale structural, dynamic, acoustic, and damage tolerance testing.

11 Claims, 11 Drawing Sheets

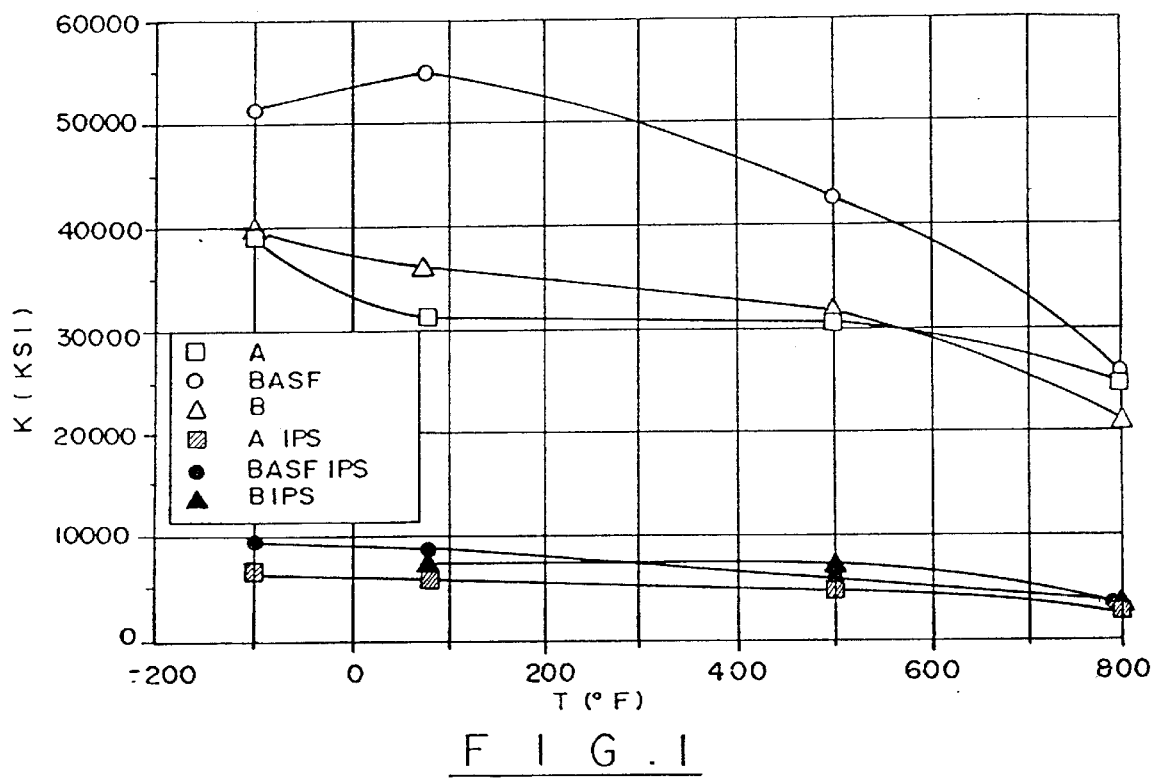
F I G . 1
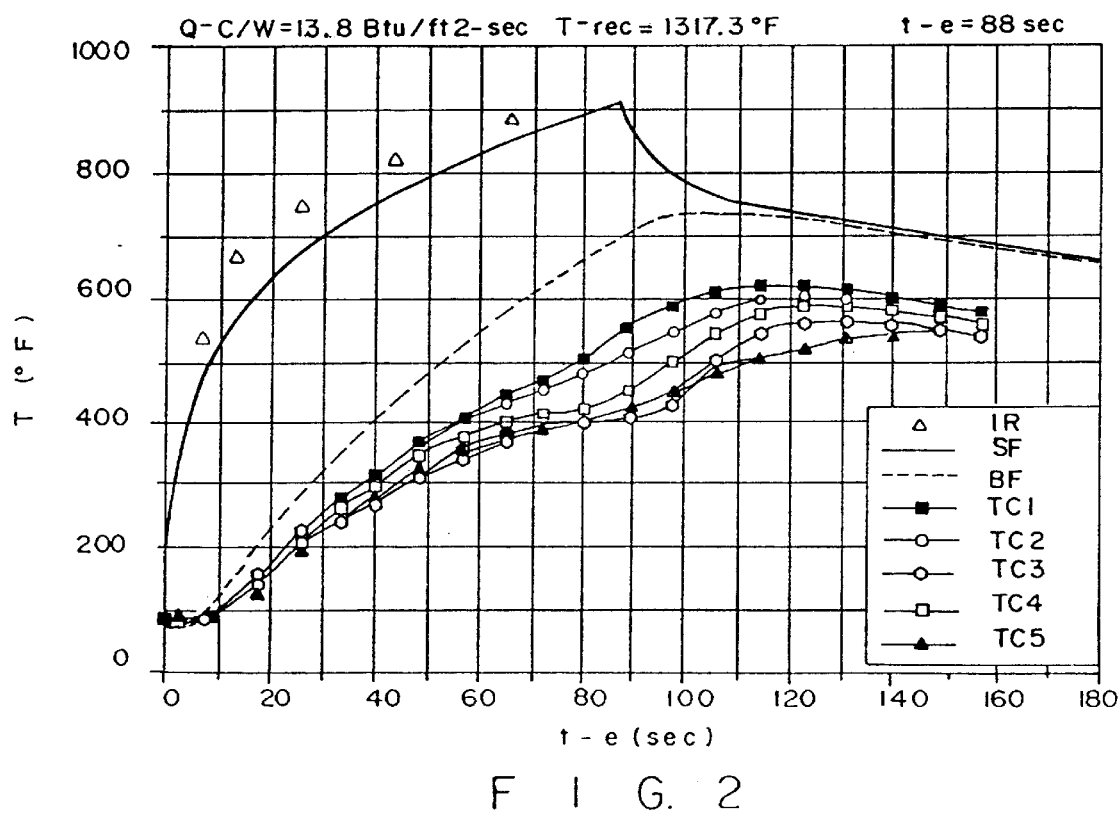
F I G . 2

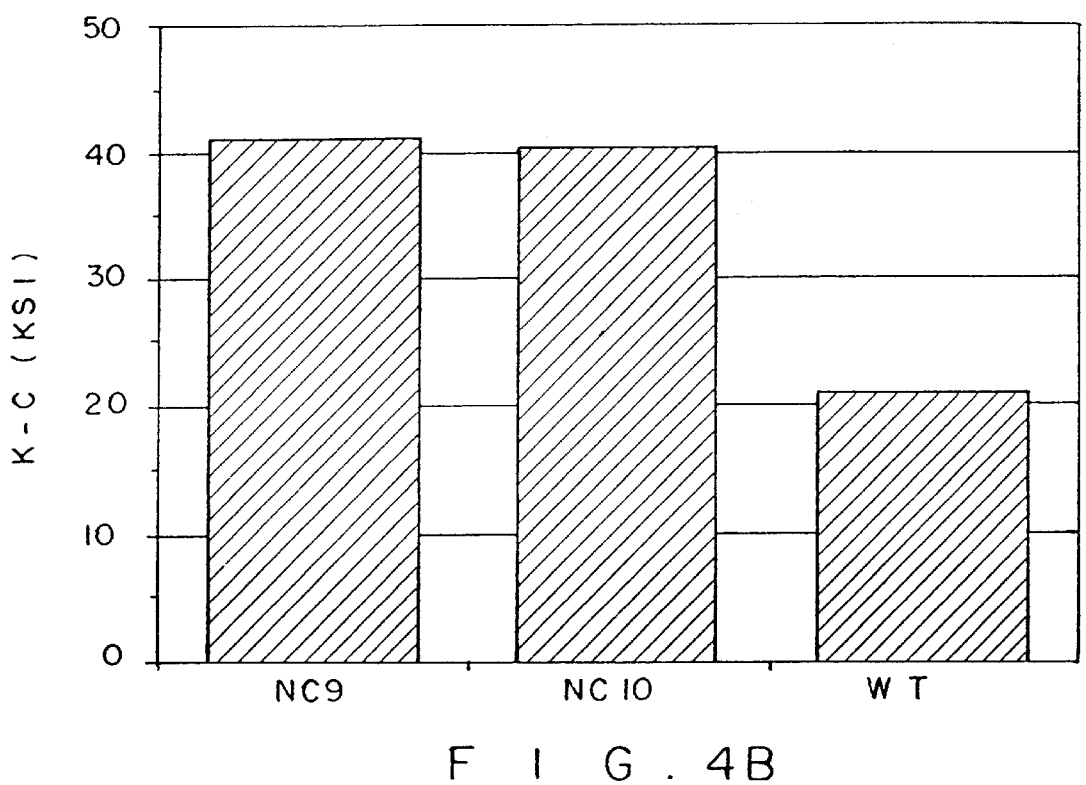
F I G . 4B
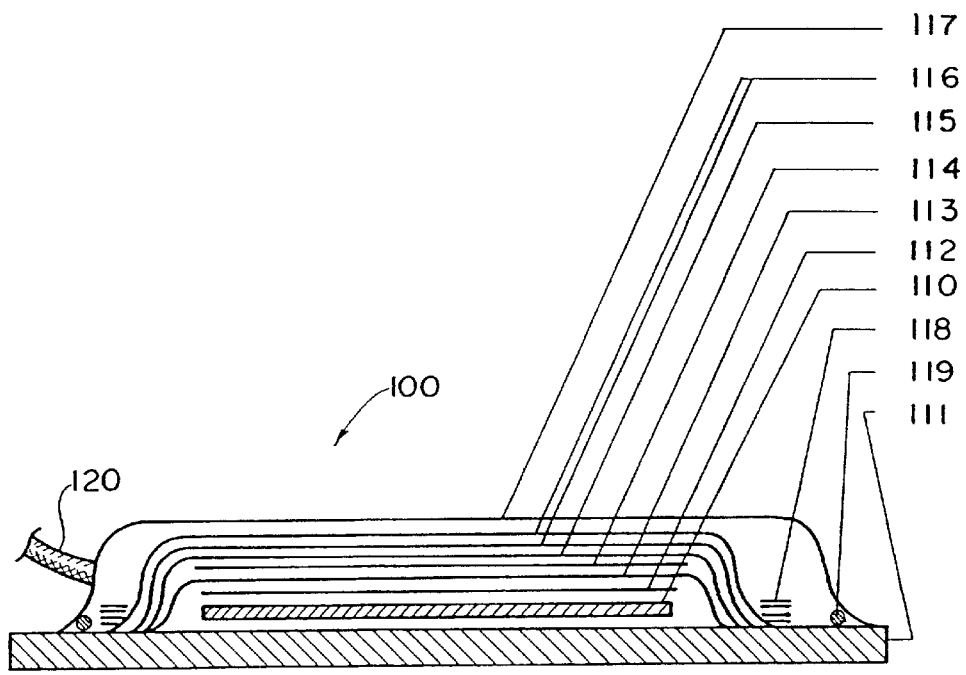
F I G. 5

HIGH PERFORMANCE STRUCTURAL LAMINATE COMPOSITE MATERIAL FOR USE TO 1000° F. AND ABOVE, APPARATUS FOR AND METHOD OF MANUFACTURING SAME, AND ARTICLES MADE WITH SAME

This is a division of U.S. patent application Ser. No. 08/550,896, filed Oct. 31, 1995 now U.S. Pat. No. 6,013,361.

The invention described herein was made in the performance of work under NASA Contract No. NAS8-36200 and is subject to the provisions of Section 305 of the National Aeronautics and Space Act of 1958 (42 U.S.C. Section 2457).

U.S. Pat. Nos. 5,380,768, 5,403,537, 5,419,139, pages 71 and 72 of the March 1995 issue of NASA Tech Briefs, and all references mentioned herein are hereby incorporated by reference.

BACKGROUND OF THE INVENTION

1. Field of the Invention

The present invention relates to composite materials technology, and more specifically to a relatively lightweight, inexpensive, durable, high performance structural laminate composite material for use to 1000° F., and above, which can advantageously be used in high temperature environments. More particularly, the preferred embodiment of the present invention relates to a graphite-fiber/phenolic-resin composite material which retains relatively high strength and modulus of elasticity at temperatures as high as 1,000° F. (538° C.). The material costs only 5 to 20 percent as much as refractory materials do. The fabrication of the composite includes a curing process in which the application of full autoclave pressure is delayed until after the phenolic resin gels. This modified curing process allows moisture to escape, so that when the composite is subsequently heated in service, there will be much less expansion of absorbed moisture and thus much less of a tendency toward delamination. In contrast, internal pressure caused by the expansion of moisture absorbed in other prior art composite materials like prior art graphite/epoxies and prior art graphite/polyimides causes delamination at temperatures in the range of 500 to 700° F. (260 to 370° C.).

2. General Background

At the request of NASA/MSFC, Martin Marietta Manned Space Systems has performed an extensive development/verification activity for a composite nose cone for the external tank (ET). At the time of the initiation of this effort, there was no materials technology available to provide a nose cone which could withstand the high heating and structural loading of the ET nose cone without (a) requiring the use of secondary heat shield materials, (b) increasing the weight of the existing nose cone, and (c) significantly increasing the cost over the existing nose cone cost. There were high temperature polymeric composite materials available; however, none met all requirements. Carbon/phenolic laminates have been proven in rocket nozzle applications to be able to withstand extreme heating conditions; however, these materials did not possess the specific strength and stiffness required for a weight-effective structure. Also, recent data shows that the materials on the market today have the potential to "ply lift," or delaminate due to internal pressure caused by absorbed moisture, at about 500° F. Graphite/polyimide laminates showed promising mechanical properties, but suffered from the moisture-induced delamination problem (also known as "thermal shock") at temperatures below 700° F. in laminates of the thickness required for a composite nose cone. Other technologies such as ceramic matrix composites and carbon/carbon were considered too expensive for this application. Therefore, a program was initiated to develop laminate material which could meet all requirements.

U.S. Pat. No. 3,724,386 for "Ablative Nose Tips and Method for their Manufacture" discloses in Example II heating graphite yarn impregnated with phenolic resin slowly to 160° F. to slowly evaporate solvent from the resin (see column 8, lines 16–18).

U.S. Pat. Nos. 4,100,322 and 4,215,161 for "Fiber-Resin-Carbon Composites and Method of Fabrication" disclose impregnating graphite yarn with phenolic resin under vacuum and a temperature of about 150° F. until the solvent has gone and the resin gels, then further heating the composite to cure it. However, the solvent stripping process was interrupted twice and each time pressure of 200 psig was applied to the composite material. It is then subjected to pyrolysis, and then pores of the composite are impregnated with phenolic resin. After this, the phenolic resin is cured at about 350° F. The resulting structure is said to be graphite/carbon/phenolic composite, and its porosity is disclosed to be 4%. A carbon/carbon/phenolic composite described therein is said to have a porosity of 5.8%.

U.S. Pat. No. 4,659,624 for "Hybrid and Unidirectional Carbon-Carbon Fiber Reinforced Laminate Composites" discloses a method similar to the method disclosed in U.S. Pat. Nos. 4,100,322 and 4,215,161 (and with similar materials), but one in which more resin is added and pyrolized up to 5 times. This patent points out at column 2, line 50 through column 3, line 2 that it is important to properly initially cure laminate materials to provide interconnecting pores which allow the escape of gases formed during post-cure pyrolysis.

U.S. Pat. No. 4,957,801 for "Advance Composites with Thermoplastic Particles at the Interface Between Layers" discloses a resin-impregnated fiber layer with outer layers of resin thereon. The fiber can comprise, for example, graphite.

U.S. Pat. No. 5,288,547 for "Toughened Resins and Composites" discloses a composite in which a porous membrane film of thermoplastic material is sandwiched between two layers of resin-impregnated fibers, and then the composite is cured in an autoclave, for example. The resin can be, for example, phenolic resin.

U.S. Pat. No. 5,359,850 for "Self Venting Carbon or Graphite Phenolic Ablatives" discloses a resin-impregnated reinforcing cloth made of, for example, graphite fibers with degradable fibers interwoven therewith. The degradable fibers are chosen such that they degrade at a temperature of about 400° F. to 500° F. so that they will provide passageways for the gaseous decomposition products produced as the resin matrix approaches the char temperature. In this patent, foreign material is introduced to create porosity. The fabric weave is altered by introducing a low-temperature degradable thread which may not assure fabric strength properties. The porosity which is created by this process is uniform. There is a definite pattern when the foreign material is replaced by voids. It is believed that the addition of these special degradable fibers will add to the cost of the material. Further, it is believed that in some cases the degradable fibers might not burn away before the plies blow apart.

U.S. Pat. No. 5,360,500 for "Method of Producing Light-Weight High-Strength Stiff Panes" discloses a panel made by a pair of surface members separated and supported by an internal core in which spaces or interconnected pores provide vents to an edge of the panel so that gas can flow through the vents during a pyrolysis process. The vents are on the order of 10 mm in diameter.

None of these patents discloses a composite material with a weight, thickness, structural performance, and pore structure as advantageous for use in a nose cone of the external tank of the space shuttle, or other high temperature structural applications, as the material of the present invention.

SUMMARY OF THE PRESENT INVENTION

A novel materials technology has been developed and demonstrated for providing a high modulus composite material for use to 1000° F. The material of the present invention can be produced at 5–20% of the cost of refractory materials, and has higher structural properties. This technology successfully resolves the problem of "thermal shock" or "ply lift," which limits traditional high temperature laminates (such as graphite/polyimide and graphite/phenolic) to temperatures of 550–650° F. in thicker (0.25" and above) laminates. The technology disclosed herein is an enabling technology for the nose for the External Tank (ET) of the Space Shuttle, and has been shown to be capable of withstanding the severe environments encountered by the nose cone through wind tunnel testing, high temperature subcomponent testing, and full scale structural, dynamic, acoustic, and damage tolerance testing.

In the present invention, cure conditions (temperature, pressure, vacuum) and cure apparatus (specific vacuum bag methodology) are manipulated to produce a graphite/phenolic composite laminate with a permeable microstructure comprising an interconnected network of pores which allows moisture to escape from the composite material when the composite material is heated; this helps prevent delamination ("ply lift" or "thermal shock") when the material is heated to temperatures above 500° F. The graphite/phenolic composite of the present invention can be used for components for applications requiring high strength and stiffness upon exposure to very high heating (e.g. rocket nozzles for missiles or launch boosters, fire walls, heat shields, circuit boards, secondary structure on missiles or launch vehicles which see high aerodynamic heating, and parts to be used on the leading edge of aerodynamic products (airplanes, jets, rockets, fuel tanks for aerospace structures, etc.)).

The present invention comprises a method of producing a composite material, comprising the steps of:

impregnating a fiber material with a resin to create a resin-impregnated fiber material;

without applying pressure, heating the resin-impregnated fiber material under vacuum at a sufficient temperature for a sufficient amount of time until the resin gels; and applying temperature (and, optionally, pressure) for a sufficient period to cure the resin-impregnated fiber material. The starting percentage by weight of fiber material (before being cured) is preferably 30–80%, with the balance resin. The resulting porosity of the composite material is preferably at least 3% by volume, more preferably about 3–25% by volume, and most preferably about 7–14% by volume.

The preferred embodiment of the method of the present invention of producing a composite material comprises the steps of:

(i) impregnating a graphite fiber material with a phenolic resin to create a resin-impregnated fiber material, in a ratio of 30–80% by weight graphite fiber and 20–70% by weight phenolic resin;

(ii) placing the resin-impregnated fiber in an autoclave or oven;

(iii) applying full vacuum and/or pressure;

(iv) raising the temperature to cause the resin to flow and initiate cure, (v) holding the material at a temperature to allow gellation of resin while volatiles are being released;

(vi) raising the temperature for final cure if required;

(vii) cooling the material;

(viii) removing the material from the autoclave or oven;

(ix) post-curing the composite laminate material removed from the autoclave, if required.

The present invention includes the composite material made by the method of the present invention disclosed herein, as well as a composite material, produced by any method, having a composition and structure which is the same as the composite material produced by the method of the present invention disclosed herein.

The material of the present invention comprises a high performance structural laminate composite material for use in high temperature applications, consisting essentially of resin-impregnated fiber, the resin-impregnated fiber consisting essentially of:

(a) preferably 50–80% by weight fiber, and (b) preferably 20–50% by weight cured resin, the composite material having:

(c) a permeability sufficient to allow moisture to escape from the composite material, without causing plylift, when the composite material is heated to temperatures up to 1000° F. More preferably, the permeability is sufficient to allow moisture to escape from the composite material, without causing plylift, even when the composite material is heated to temperatures above 1000° F. The material of the present invention has a microscopic construction which provides permeability that is sufficient to allow moisture to escape therefrom as it is heated to temperatures up to 1000° F. and above without exhibiting ply-lift.

The composite material preferably has an across-ply permeability having a Darcys constant of at least $10^{-15}$ cm$^2$. More preferably, the across-ply permeability of the composite material has a Darcy's constant of at least $10^{-14}$ cm$^2$. Most preferably, the across-ply permeability of the composite material has a Darcy's constant of at least $10^{-13}$ cm$^2$.

The material of the present invention comprises a high performance structural laminate composite material for use in high temperature applications, consisting essentially of phenolic resin-impregnated graphite fiber, the phenolic resin-impregnated graphite fiber consisting essentially of:

(a) preferably 50–80% by weight graphite fiber; and (b) preferably 20–50% by weight cured phenolic resin, the composite material having:

(c) a permeability sufficient to provide a network of pores which allows moisture to escape from the composite material, without causing plylift, when the composite material is heated.

The percentage by weight of graphite fiber is more preferably 60–80%, and the percentage by weight of cured phenolic resin is more preferably 20–40%. Most preferably, the percentage by weight of graphite fiber cloth is 65–75%, and the percentage by weight of cured phenolic resin is 25–35%.

Preferably, the porosity is 3–25% by volume. Most preferably, the porosity is 7–14% by volume.

Preferably, the compressive strength of the material after exposure to temperatures above 700° F. for several minutes is at least 50% of the compressive strength of the material immediately after being cured, the shear strength of the material after exposure to temperatures above 700° F. for several minutes is at least 50% of the shear strength of the material immediately after being cured, and the compressive strength of the material at 900° F. is at least 25% of the compressive strength of the material at room temperature.

The graphite fiber cloth was selected to have a combination of high strength, high modulus, good thermo-oxidative stability, and moderate cost. The optimum fiber type to provide this balance is a fiber made from a polyacrylynitrile (PAN) precursor, such as the Toho G30-5001 fiber used in the development documented herein. Similar fibers are Hercules AS4 and IM-7, and Amoco T300, T650-35, and T650-45. Fiber types which were not selected were fibers based on pitch precursors (e.g., Amoco P-75 and P-100), or fibers based on rayon precursors. Pitch based fibers are much more expensive and do not have adequate strength. Rayon based fibers do not have the desired strength or modulus. The selected fiber was woven into an 8-harness satin fabric to facilitate part fabrication. The selected fiber can be, for example, an eight-harness fabric woven from Toho G-30/500-3K graphite fiber. The resin is advantageously selected from a group consisting of phenolics, bismaleimides (BMIs), polyimides, cyanate esters, epoxies, or any blend of these resins. The resin can comprise Cytec 506 phenolic resin.

Preferably, the graphite fiber material has a minimum tensile strength of at least 300 KSI, more preferably at least 400 KSI, and most preferably at least 500 KSI, a minimum modulus of at least 20 MSI, more preferably at least 25 MSI, and most preferably at least 30 MSI, and relatively low cost. Most preferably, the resin is phenolic resin.

The material can consist of phenolic resin-impregnated graphite fiber cloth, and the phenolic resin-impregnated graphite fiber cloth can consist of graphite fiber cloth and cured phenolic resin.

The present invention also includes apparatus comprising a component which requires high strength and stiffness upon short term exposure to very high heating, made of the material of the present invention. The component can be a rocket nozzle, a part for an aerodynamic vehicle, or some other component exposed to high heating. The component can be part of a fire wall or heat shield.

Further, the present invention comprises vacuum bag apparatus for producing a composite laminate material having a network of pores. This vacuum bag apparatus can comprise:

(a) a base for receiving the laminate material thereon;

(b) a non-stick layer to be received on the laminate material for helping to prevent the laminate material from sticking to layers above the non-stick layer;

(c) a first volatiles flow and resin retaining layer above the non-stick layer for allowing volatiles, but not the majority of the resin, to escape from the laminate material through the first volatiles flow and resin retaining layer as heat is applied and the vacuum is drawn in the bag apparatus;

(d) a bleeder layer on the first volatiles flow and resin retaining layer for absorbing most of the resin which flows through the first volatiles flow and resin retaining layer;

(e) a second volatiles flow and resin retaining layer on the bleeder layer for allowing volatiles, but very little resin, to flow through the bleeder layer as heat is applied and the vacuum is drawn in the vacuum bag apparatus;

(f) a first gas-flow layer on the second volatiles flow and resin retaining layer for allowing gas to flow evenly through the vacuum bag apparatus when a vacuum is drawn in the apparatus;

(g) a lateral gas-flow layer surrounding the laminate material to ensure that volatiles can flow out of the laminate in virtually any direction;

(h) a vacuum bag layer attached to the base in an air-tight manner, the base and the vacuum bag layer enclosing the laminate material and the non-stick layer, the first volatiles flow and resin retaining layer, the bleeder layer, the second volatiles flow and resin retaining layer, the gas-flow layer, and the lateral gas-flow layer. In certain circumstances, one or more of the layers can be omitted, as described further below. The vacuum bag apparatus preferably also comprises a port in the vacuum bag layer communicating with a vacuum source for allowing a vacuum to be pulled in the bag. In a room at standard temperature and pressure, the vacuum causes a pressure of about 15 psi to be applied to the laminate in the vacuum bag. The application of additional pressure may not be a necessary step to make the present invention work.

It is an object of the present invention to provide a high-strength, low weight, high temperature material which has sufficient permeability to allow moisture to exit therefrom, even when the material has a thickness of more than 0.40", when heated to temperatures of above 500° F., without damaging the internal structure of the material.

It is an object of the present invention to provide a high-strength, low weight, high temperature material which has sufficient permeability to allow moisture to exit therefrom, even when the material has a thickness of more than 0.40", when heated to temperatures of above 1000° F., without damaging the internal structure of the material.

It is another object of the present invention to provide a method of making such material.

A further object of the present invention is to provide components made of such material.

It is also an object of the present invention to provide a material which can withstand the high heating and structural loading of the ET nose cone without (a) requiring the use of secondary heat shield materials, (b) increasing the weight of the existing nose cone, and (c) significantly increasing the cost over the existing nose cone cost.

Another object of the present invention is to provide an ET nose cone made of this material.

Unlike many prior art methods of producing composite material, in the method of the present invention, there is no pyrolizing step (the composite material of the present invention is not pyrolized). In the method of the present invention, unlike the method of U.S. Pat. No. 5,359,850: no foreign material is introduced to create porosity; the fabric weave is not altered and areal weight of fabric is constant, which assures strength properties; the porosity which is created by the process of the present invention is random and spread over the composite laminate; no material is decomposed by the method of the present invention; and the cost of creating the porosity is relatively low.

Because of the high permeability of the material of the present invention, it is believed by the inventors that there will be no ply lift at any thickness, whether the laminate is at least 0.1 inch thick, at least 0.2 inch thick, at least 0.4 inch thick, or even more than 4 inches thick.

Although the specific examples described herein relate to graphite fiber and phenolic resin, other appropriate fibers and resins could be used in conjunction with the present invention.

BRIEF DESCRIPTION OF THE DRAWINGS

For a further understanding of the nature and objects of the present invention, reference should be had to the following detailed description taken in conjunction with the accompanying drawings, in which like parts are given like reference numerals, and wherein:

FIG. 1 is a comparison of the compression strengths and in-plane shear strengths of various graphite/phenolics as a function of temperature in which material A is Gr/Ph made by standard prior art technology, material B is Gr/Ph made by standard prior art technology, and BASF is the resin-impregnated fiber, an eight-harness fabric woven from graphite fiber impregnated with phenolic resin, used to make the present invention; in FIG. 1, "A" refers to the compression strength of material A, "BASF" refers to the compression strength of the material used to make the present invention, and "B" refers to the compression strength of material B, "A IPS" refers to the in plane shear strength of material A, "BASF IPS" refers to the in plane shear strength of the material used to make the present invention, "B IPS" refers to the in plane shear strength of material B, "K" represents strength, and "T" represents temperature in degrees Fahrenheit;

FIGS. 2 and 3 are wind tunnel temperature profiles, with FIG. 2 is a wind tunnel temperature profile showing the results of a maximum gradient test and FIG. 3 is a wind tunnel temperature profile showing the results of a maximum temperature test, in which "Q-c/w" refers to heating rate, "T-rec" refers to recovery temperature, "IR" refers to infra-red camera (used to measure surface temperature), "SF" refers to airflow surface, "BF" refers to non-heated surface, "TC 1" refers to thermocouple 1 (backface), "TC 2" refers to thermocouple 2 (backface), "TC 3" refers to thermocouple 3 (backface), "TC 4" refers to thermocouple 4 (backface), "TC 5" refers to thermocouple 5 (backface), "T" represents temperature in degrees Fahrenheit, and "t-e" represents exposure time in seconds;

FIGS. 4A and 4B are comparisons of shear strengths and compression strengths, respectively, of post-test wind tunnel panels with as-cured laminates, in which "NC 9" refers to nose cone 9 (tag end specimens) as-cured, NC 10 refers to nose cone 10 (tag end specimens) as-cured, "WT" refers to panels after being subjected to wind tunnel testing, "K-S" referes to shear strength in pounds per square inch (psi), and "K-C" refers to compression strength in KSI;

FIG. 5 is a schematic side view of the preferred bagging sequence of the present invention to produce graphite/phenolic resin laminate;

DETAILED DESCRIPTION OF THE PREFERRED EMBODIMENT

Figure 3:
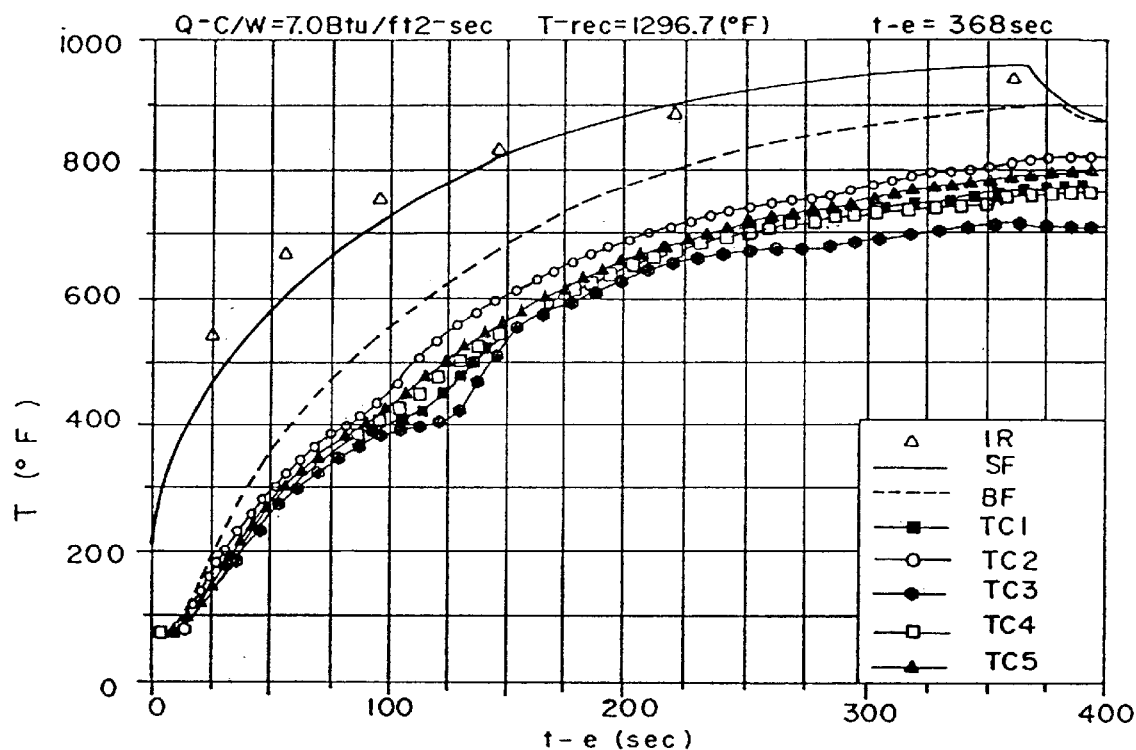

The following table lists the part numbers and part descriptions as used herein and the drawings attached hereto.

| Part Number | Description |
| --- | --- |
| 10 | space shuttle |
| 20 | external tank of space shuttle 10 |

-continued

| Part Number | Description |
|---|---|
| 21 | nose cone for the external tank 20 |
| 23 | reusable orbiter of space shuttle 10 |
| 24 | barrel sections of external tank 20 |
| 26 | dome sections of external tank 20 |
| 30 | expendable solid rocket motors of space shuttle 10 |
| 31 | nozzles of rocket motors 30 |
| 100 | vacuum bag apparatus of the present invention |
| 110 | laminate of the preferred embodiment of the present invention |
| 111 | base of vacuum bag apparatus 100 |
| 112 | release (non-stick) layer (234-TFP or Bleeder Lease "E") |
| 113 | first volatiles flow and resin retaining layer (perforated PTFE) |
| 114 | bleeder layer (preferably 1581 fiberglass or Airweave Super 10) |
| 115 | second volatiles flow and resin retaining layer (perforated PTFE) |
| 116 | gas-flow layer (Airweave Super 10) |
| 117 | vacuum bag layer (Upilex or Kapton film) |
| 118 | lateral gas-flow layer (Airweave Super 10) |
| 119 | tape to hold layer 117 to base 111 (Schnee-Moorehead 5126-2 tape) |
| 120 | port communicating with vacuum source (not shown) |

(PTFE is polytetrafluoroethylene, most commonly known by the trademark "TEFLON".)

Development Summary

The composite nose cone program demanded a material which could maintain structural integrity above 900° F. for several minutes. Preliminary investigations indicated that the combination of a high performance graphite fiber with a high strength phenolic resin showed promise in meeting requirements. A test program comparing three different graphite/phenolic laminates resulted in the selection of a laminate material consisting of an eight-harness fabric woven from Toho G-30/500-3K graphite fiber impregnated with Cytec 506 phenolic resin as the material of choice due to its high mechanical properties and its good handling and processing characteristics. FIG. 1 shows some of the results of this screening program. However, even with extensive post-curing, all laminates had a tendency to delaminate in laminates over 0.15" thick when exposed to temperatures above 500° F.

Extensive chemical, physical, and mechanical testing indicated that absorbed moisture was the cause of the delamination problem. However, it was observed that a few of the laminates fabricated with a higher porosity content could withstand the elevated temperatures with no apparent degradation. Therefore, a program was initiated to determine processing conditions under which laminates, which would meet all performance requirements, could be repeatably fabricated.

To accomplish this, a designed experiment was established and carried out; the test matrix is shown in Table 1. The results of the study are shown in Table 2 (wherein "Insp. Lev." refers to ultrasonic inspection level, and is expressed in decibels ("db")). This table shows that all except two of the panels tested met all requirements. Based on careful examination of cure cycles and test results, it was concluded that the key to producing high performance composites was to not apply extensive autoclave pressure to laminates before resin gels. Further statistical evaluation of the results led to the selection of a robust cure cycle which can accommodate significant processing variations without compromising performance. This cure cycle is shown in Table 3. A post-cure cycle is shown in Table 3A. The application of pressure in step 4 in Table 3 is optional (in other words, it is possible to cure the laminate material without applying pressure in addition to the vacuum). The leading thermocouple and the lagging thermocouples represent most rapidly heating and slowest heating areas of the part, respectively.

Before the cure cycle shown in Table 3 is performed, one takes graphite fiber fabric and impregnates it with a suitable phenolic resin, preferably in a ratio of 30–80% by weight graphite fiber and 20–70% by weight phenolic resin and volatiles. One then preferably places the resin-impregnated fiber laminate 110 of the preferred embodiment of the present invention into vacuum bag apparatus 100 of the present invention (see FIGS. 5 and 7).

TABLE 1

Cure Cycle Matrix (Experiment Design)

| Cure Schedule (Panel I.D.) | Hold Temp. (° F.) | Dwell Time (minutes) | Max. Pressure (psi) |
|---|---|---|---|
| 1 | 240 | 78 | 135 |
| 2 | 240 | 15 | 5 |
| 3 | 200 | 78 | 5 |
| 4 | 200 | 15 | 135 |
| 5 | 240 | 78 | 5 |
| 6 | 240 | 15 | 135 |
| 7 | 200 | 78 | 135 |
| 8 | 220 | 78 | 70 |
| 9 | 200 | 47 | 70 |
| 10 | 220 | 47 | 5 |
| 11 | 200 | 15 | 5 |
| 12 | 240 | 47 | 135 |

One first places the laminate 110 onto base 111 (which can be aluminum, iron, metal-filled ceramic, or graphite/epoxy, for example) of vacuum bag apparatus 100. When the base is used to make other than a flat piece (such as a nose cone 21), it is preferable to make the base of a material which matches the thermal expansion characteristics of the laminate. The best way to match the thermal expansion characteristics of the laminate is to use the same material as the laminate. Thus, the material used for the base can advantageously often be made of the same material as the laminate; for example, if a graphite/phenolic resin nose cone is being constructed using the vacuum bag apparatus of the present invention, the base could also be constructed of a graphite/phenolic laminate (preferably cured as in Tables 3 and 3A in advance so that it does not delaminate when heat is applied).

TABLE 1A

Lay-Up Pattern for Graphite Fiber Fabric

| Ply Level | Warp Direction |
|---|---|
| 1 | 0° |
| 2 | 45° |
| 3 | 90° |
| 4 | −45° |
| 5 | 0° |
| 6 | 45° |
| 7 | 90° |
| 8 | −45° |
| 9 | 0° |
| 10 | 0° |
| 11 | −45° |
| 12 | 90° |
| 13 | 45° |
| 14 | 0° |
| 15 | −45° |
| 16 | 90° |
| 17 | 45° |
| 18 | 0° |

After placing laminate 110 on base 111, a non-stick layer (release layer) 112 is placed on laminate 110. Non-stick layer 112 is used to help prevent laminate 110 from sticking to the other layers above it, and is preferably made of 0.003–0.007 inch thick 234-TFP film (a fiberglass material coated with a PTFE release coating) or 0.005–0.010 inch thick Bleeder Leese "E" material (a glass fabric coated with a release coating or equivalent), although any flexible non-bonding material which allows resin to flow through it during the cure process could work. Airtech International Inc. of Carson, Calif., 90749 sells 234-TFE film and Bleeder Leese "E" material. The purpose of non-stick layer or release fabric 112 is to provide a porous medium for resin to flow through into the bleeder layer 114 which will not become permanently bonded to the laminate 110 during the cure (the release agents allow the fabric 112 to easily be removed). A liquid or aerosol release agent is applied to base 111 to prevent laminate 110 from bonding to base 11 during the cure. Releasomers XK-22 brand release agent is a typical release agent.

Above non-stick layer 112 is a first volatiles-flow-and-resin-retaining layer 113 for allowing volatiles, but not the majority of the resin, to escape from the laminate 110 as heat is applied and the vacuum is drawn in the bag apparatus 100. Layer 113 is made of perforated release film with circular perforations which are 0.001–0.100 inch in diameter and whose centers are spaced 0.25 inch–4.0 inches apart. The perforation size and spacing is important to bleed enough volatiles from laminate 110 without bleeding too much resin. Layer 113 is preferably made of 1 mil perforated PTFE with perforations which are 0.045 inch in diameter and whose centers are spaced ½ inch apart. Depending upon the viscosity of the resin used and the resin removal requirements of the particular resin system used, the perforations can be smaller or bigger and spaced further apart or closer together. Airtech International Inc. sells such a perforated PTFE film.

Above the first volatiles-flow-and-resin-retaining layer 113 is a bleeder layer 114 for absorbing most of the resin which flows through the perforations in layer 113. Bleeder layer can be made of an absorbent material, such as fiberglass fabric or polyester or nylon felt. It is preferably made of 1581 fiberglass (though other weaves of fiberglass may be used), 0.008–0.012 inch thick, or Airweave Super 10 brand polyester felt material, 0.080–0.20 inch thick. The quantities and materials used can be tailored for a particular laminate material depending on the amount of resin to be removed during the cure. When a 4–8 ply laminate is being processed in apparatus 100, bleeder layer 114 can advantageously be a single ply of 1581 fiberglass. When a 9–13 ply laminate is being processed in apparatus 100, bleeder layer 114 can advantageously be two plies of 1581 fiberglass. When a 14–24 ply laminate is being processed in apparatus 100, bleeder layer 114 can advantageously be a single ply of Airweave Super 10 brand breather material. When a 25–32 ply laminate is being processed in apparatus 100, bleeder layer 114 can advantageously be one ply of Airweave Super 10 brand breather material and one ply of 1581 fiberglass.

Above bleeder layer 114 is a second volatiles-flow-and-resin-retaining layer 115 for allowing volatiles, but very little resin, to flow through bleeder layer 114 as heat is applied and the vacuum is drawn in the bag apparatus 100. Layer 115 is made of perforated release film with circular perforations which are 0.001–0.100 inch in diameter and whose centers are spaced 0.25 inch–4.0 inches apart. Layer 115 is preferably made of 1 mil perforated PTFE with perforations which are 0.045 inch in diameter and whose centers are spaced two inches apart. The perforation size and spacing is important to bleed enough volatiles from bleeder layer 114 without bleeding too much resin. Depending upon the viscosity of the resin used and the resin removal requirements of the particular resin system being used, the perforations can be smaller or bigger and spaced further apart or closer together.

Above the second volatiles-flow-and-resin-retaining layer 115 is a gas-flow (breather material) layer 116 for allowing gas to flow evenly through the vacuum bag apparatus 100 when a vacuum is drawn in apparatus 100. Layer 116 helps to prevent vacuum bag layer 117 from sticking to layer 115, it helps to insure uniform vacuum on the laminate, and it provides a path for volatiles removal. Layer 116 can be made of fiberglass, polyester or nylon felt, and can advantageously be made of two plies of Airweave Super 10 brand polyester material. Glass (such as 1581 fiberglass) is typically used in cures above 400° F. because such high temperature would degrade the polyester or nylon.

Atop gas-flow layer 116 is a vacuum bag layer 117, preferably made of Upilex brand polyimide film or Kapton brand polyimide film. If a ply of PTFE, Kapton brand polyimide material, Upilex brand polyimide material, or other phenolic-resin compatible material is used as a barrier to prevent resin from touching the vacuum bag layer 117, then Ipplon DP-1000 brand nylon film material could be used as layer 117. The purpose of vacuum bag layer 117 is to allow creation of a vacuum on the laminate 110 which imposes atmospheric pressure on the laminate 110 and allows application of (optional) autoclave pressure. Kapton brand polyimide film is manufactured by E.I. du Pont and Ipplon DP-1000 is manufactured and/or distributed by Airtech International Inc.

Surrounding the laminate 110 and layers 112–116 is a lateral gas-flow layer ("breather picture frame") 118. Lateral gas-flow layer 118 is used to ensure that the volatiles can flow out of laminate 110 in virtually any direction to reach the vacuum source. Layer 118 can advantageously be made of 4 plies of Airweave Super 10 brand breather material. Layer 118 can be made of any material of which layer 116 is made. Airweave Super 10 is commercially available from Airtech International Inc. in Carson, Calif., 90749.

Tape 119 is a means to hold layer 117 to base 111 or to itself. This tape can advantageously be Schnee-Moorehead 5126-2 tape, a rubbery and sticky, aggressively tacky, tape.

Layers 114 and 115 are optional. Depending on the specific fiber and resin used, they may not be required, though it is preferred to include them both in apparatus 100. Further, either layer 112 or 113 may be omitted, as each one performs, to some extent, the duties of the other (layer 113 serves, to a certain extent, to prevent laminate 110 from sticking to the layers above it and layer 112 serves, to a certain extent, to limit the amount of resin which flows upward from laminate 110 while allowing volatiles to flow through layer 112). Depending on the specific fiber and resin used, neither may be required, though again, it is preferred to include them both in apparatus 100.

There is a port 120 (see FIG. 7) communicating with a vacuum source (not shown) for drawing a vacuum in vacuum bag apparatus 100. When a substantially full vacuum is pulled in apparatus 100 at standard temperature and pressure, a relative pressure of approximately 15 p.s.i. is placed on laminate 110.

Figure 7:
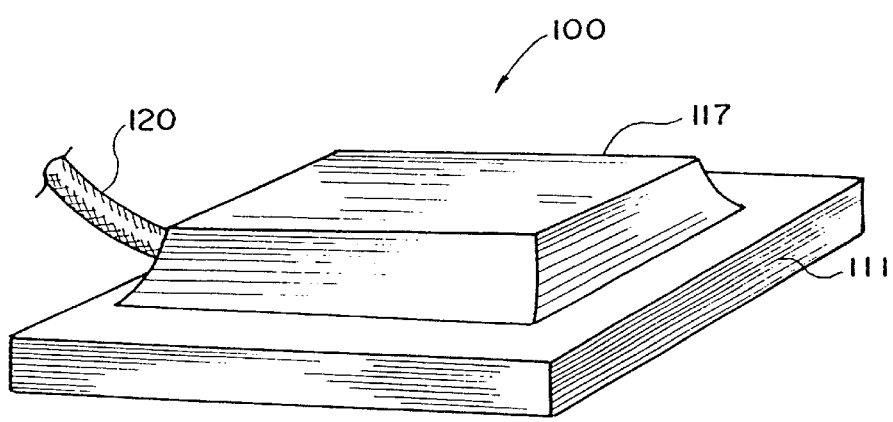
FIG. 7 is a perspective view of the preferred vacuum bag apparatus of the present invention used to produce the graphite/phenolic resin laminate of the present invention.

Once the laminate 110 is bagged in apparatus 100 as shown in FIGS. 5 and 7, apparatus 100 is placed in an autoclave or an oven. Heat is then applied as shown in Tables 3 and 3A.

The vacuum is applied in step 1 of Table 3 to compact the laminate 110 and remove entrapped air and volatiles therefrom. Heat is applied in step 2 of Table 3 to reduce the viscosity of the resin. This helps to allow entrapped air to move through the laminate 110 and be removed through vacuum port 120. The heat applied in Steps 3, 4, and 5 of Table 3 causes the resin to gel.

The heat applied in Step 6 of Table 3 and in Steps 1–3 of Table 3A is for causing the resin to cross-link.

EXAMPLE 1

Flat Laminate

Introduction

Carbon cloth phenolic matrix composites (CCP) are used extensively in the aerospace community in the design of thermal protective liners for structures exposed to high temperatures. One of these applications is for the leading edges of structures on vehicles subjected to aerodynamic heating. The Nose Cone of the external fuel tank of the space shuttle is one such structure. This structure is required to withstand high frictional loads and transient temperatures in the 540° C. (1000° F.) range. CCP composites are a natural candidate for use in this environment. A PAN-based graphite/phenolic has been evaluated for this purpose. Process development to date has yielded a material which retains structural load carrying capability to 540° C. However, some of the materials fabricated have exhibited delaminations at temperatures above 285° C. (550° F.).

Historically, CCP materials in general have performed inconsistently. Evidence of several types of anomalous behavior have been observed in post-fired nozzles and exit cones of solid rocket boosters (Stokes, E. H., and Upton, C. G., "Selection of Improved Acceptance Tests for Cured Carbon Phenolic Composites, Phase II," in: *Proceedings JANNAF-RNTS Meeting*, MSFC, AL, edited by M. J. Paul, CPIA Pub., October, 1993; Stokes, E. H., "Selection of Improved Acceptance Tests for Cured Carbon Phenolic Composites (Volume 2: Step 6a)," SRI-MME-93-610-6672. Jul. 14, 1993). A number of these anomalous material responses are due to the development of internal gas pressure within the material as it is being heated during firing. This internal pore pressure is a function of the materials' permeability and rate of gas production. The room-temperature as-cured in-plane permeability of standard-density rayon-based materials has been shown to be critical to the materials' performance (Stokes, E. H. and Puckett, A. N., "Results of the 19B Cowl Post Flight Study," in: *Proceedings JANNAF-RNTS Meeting*, Sunnyvale, Calif., edited by J. J. Paul, CPIA Pub. 592, December, 1992, pp. 503–512; Stokes, E. H. and Puckett, A. N., "Mechanical and Thermal Property Differences Between TEM-7 and. FSM-1 and Possible Implications of Plylift," in: *Proceedings JANNAW-RNTS Meeting*, MSFC, Ala., edited by M. J. Paul, CPIA Pub. 572, November, 1991, pp. :23–31). In low ply angle to heated surface applications, this is due, largely, to the materials' extremely low as-cured across-ply permeability (Stokes, E. H., "Permeability of Carbonized Rayon Based Polymer Composites," in: *Proceedings ASME Symposium on Computational Mechanics of Porous Solid Materials and Their Thermal Decomposition*, Scottsdale, Ariz., AMD-Vol. 136, April, 1992, pp. 145–156). Theoretically, a material's performance should be enhanced if the as-cured across-ply

TABLE 2

Results of Designed Experiment

| Void % (by vol.) | Fiber % (by vol.) | Resin % (by vol.) | Density (g/cm³) | 600° F. Exposure | 900° F. Exposure | Compression (KSI) Ave. | Std. Dev. | Short Beam Shear (psi) Ave. | Std. Dev. | Insp. Lev. (db) | Panel I.D. |
|---|---|---|---|---|---|---|---|---|---|---|---|
| 3.27 | 65.7 | 31.0 | 1.545 | delam. | delam. | 34.0 | 3.62 | 3160 | 388 | 21 | 9 |
| 4.10 | 65.8 | 30.1 | 1.536 | delam. | delam. | 34.3 | 4.05 | 3710 | 130 | 17 | 4 |
| 5.44 | 64.9 | 29.6 | 1.514 | PASS | PASS | 32.3 | 1.95 | 3610 | 118 | 41 | 7 |
| 7.10 | 63.8 | 29.2 | 1.486 | PASS | PASS | 40.5 | 3.72 | 4080 | 440 | 37 | 11 |
| 8.04 | 62.9 | 29.1 | 1.470 | PASS | PASS | 44.0 | 1.22 | 4310 | 97.1 | 42 | 3 |
| 8.61 | 63.4 | 28.0 | 1.467 | PASS | PASS | 43.6 | 2.37 | 3912 | 266 | 47 | 8 |
| 8.74 | 62.9 | 28.3 | 1.462 | PASS | PASS | 43.8 | 1.53 | 4030 | 272 | 46 | 10 |
| 9.29 | 65.4 | 25.3 | 1.453 | PASS | PASS | 41.3 | 3.55 | 4080 | 171 | 50 | 2 |
| 9.44 | 62.4 | 28.1 | 1.450 | PASS | PASS | 43.2 | 1.58 | 4200 | 154 | 47 | 5 |
| 9.48 | 62.5 | 28.0 | 1.450 | PASS | PASS | 43.4 | 2.26 | 4080 | 105 | 45 | 6 |
| 9.56 | 61.7 | 28.7 | 1.448 | PASS | PASS | 43.1 | 1.74 | 4230 | 137 | 46 | 12 |
| 9.97 | 62.0 | 28.0 | 1.442 | PASS | PASS | 44.6 | 1.88 | 4160 | 86.5 | 50 | 1 |
| N/A | N/A | N/A | N/A | PASS | PASS | 26.1 | N/A | 3225 | N/A | N/A | Requirement | permeability of the material is significantly increased. The present inventors examined the effects of process variables on the as-cured across-ply permeability and other pore-pressure-related properties of a two-dimensional PAN-based graphite/phenolic. The data was necessary to support development of a graphite/phenolic nose cone for the External Tank under Production Technology Task 2235.

TABLE 3

OPTIMIZED GR/PH CURE CYCLE

1. Apply full vacuum
2. Based on lagging thermocouple, raise temperature to 175 ± 5° F. in 160 ± 10 min. and hold for 60 + 5, −0 min.
3. Raise temperature at 1.0–1.5° F. per minute to 220 ± 10° F. based on leading part thermocouple and hold. Hold may be started as soon as leading thermocouple reaches 210° F.
4. At 78 minutes into the hold based on leading part thermocouple, ramp pressure to 5 ± 1 psi in 6 ± 2 min. Hold at 220° F. for an additional 36 minutes after pressure is reached. Retain pressure throughout cure.
5. At 1.0–1.5° F. per minute, raise temperature to 240 ± 5° F. based on lagging part thermocouple and hold for 30 ± 5 minutes.
6. At 1.0–1.5° F. per minute, raise temperature to 350 ± 5° F. based on lagging part thermocouple and hold for 60 ± 5 minutes.
7. Cool at 1–4° F. per minute to 150° F. or below.
8. Remove from autoclave and leave under vacuum until part reaches 100° F. or below.

TABLE 3A

GR/PH POST CURE CYCLE

1. At 3–5° F. per minute, raise laminate temperature to 250 ± 10° F. and hold for 2 ± 1 hrs.
2. At 3–5° F. per minute, raise laminate temperature to 350 ± 10° F. and hold for 24 ± 1 hrs.
3. At 1–3° F. per minute, raise laminate temperature to 415 ± 10° F. and hold for 16 ± 1 hrs.
4. At 1–5° F. per minute, cool laminate to room temperature.

MATERIALS AND METHODS

The material used in this study was Cytec G30-500-3K-8HS/506 graphite/phenolic prepreg. The cured panels were produced using a 0/45/90 ply lay up as shown in Table 1A. The overall approach included, defining the critical process variables, establishing a statistically based test matrix, fabrication of test articles, testing to assess each part's level of performance, analysis of data to determine the ideal processing envelope, defining the cure cycle and defining test programs to establish allowables and verify repeatability of processing. Crucial variables were determined by examining the mechanical and high temperature performance of laminates fabricated using various cure cycles. This data indicated that the dwell time, hold temperature, and maximum pressure achieved during the second constant temperature hold of the cure cycle are the critical variables in the process. These three variables most affect the degree of consolidation and level of porosity of the laminate which, in turn, affect the mechanical and high temperature performance of the material.

Eighteen plies (see Table 1A for lay-up pattern) of an eight-harness fabric woven from Toho G-30/500-3K graphite fiber were impregnated with Cytec 506 phenolic resin in a ratio of 61–65% by weight graphite fiber and 35–39% by weight phenolic resin.

The resin-impregnated fiber laminate was then placed in apparatus 100 shown in FIGS. 5 and 7. The cure cycle of Table 3 was then performed, followed by the post cure cycle of Table 3A.

The laminate after the cycle of Table 3A had the following characteristics:
Average thickness: 0.23–0.25 inch,
Density: 1.4–1.5 g/cc;
Porosity: 7–10 by volume,
Fiber Volume: 56–62%
Average compression strength at room temperature (about 77° F.): 50.2 KSI;
Average compression strength at 500° F.: 48.0 KSI;
Average short beam shear strength at room temperature: 4000 psi; and
Average short beam shear strength at 500° F.: 3200 psi.

The processing matrix design was accomplished using statistical experiment design software (ECHIP, RS-1, D-optimal) in conjunction with Marshall Space Flight Center (MSFC). The processing matrix can be seen in Table 1. Laminate samples were taken from each of the twelve panels for the determination of density, void volume, fiber volume, hot/wet testing, compression, short beam shear, TGA, and DSC. Five of the panels were examined for room-temperature across-ply permeability, and plylift propensity. Two panels were tested for Karl Fischer moisture content and helium pycnometry pore volume. The elevated temperature across-ply permeability and wet/dry across-ply thermal expansion were also examined in the nominal material.

Physical Properties

Two methods were used in the determination of fiber volume, i.e., STM H693-1 and ASTM D3171, Procedure A. Void content was determined by fiber and resin fraction subtraction from bulk density and open porosity using helium pycnometry.

Hot/Wet Performance

Ultrasonically inspected specimens were exposed to elevated temperatures to determine their ability to resist delamination. Specimens were placed in a preheated chamber. This chamber consisted of a high-temperature, high-flow, flameless torch with feedback controller connected to a ceramic nozzle, leading to a 15.2 cm (6") diameter circular ceramic test chamber. The chamber was allowed to equilibrate at a temperature approximately 55° C. (100° F.) above the test temperature; then a 11.4×11.4×0.63 cm (4.5×4.5×0.25") specimen was inserted into the chamber and brought to temperature at a rate of 55–167° C./minute (100–300° F./minute). The specimen was allowed to remain at the test temperature for 7 minutes before being removed. The specimens were visually and ultrasonically inspected for delamination after the test.

TGA and DSC

Thermogravimetric analysis (before and after post cure) and Differential Scanning Calorimetry (before and after cure) (per TPS-COM-011P) were performed on the materials at various times during their processing.

Mechanical Properties Short beam shear per ASTM D2344 and compressive strength per ASTM D695 were conducted on each panel.

Permeability and Thermal expansion

Across ply permeability at room and elevated temperature and across ply thermal expansion on wet and dry material at 10° F./second were performed on a selected set of panels. A detailed description of the procedures employed can be found elsewhere (Stokes, E. H., "Plylift Related Property Differences Between TEM-7 and FSM-1 Tag End Carbon Phenolic," SRI-MME-92-109-6526. Feb. 15, 1992, 121 p.).

Plylift Testing

The plylifting propensity of five of the materials with varying as-cured porosity were tested in a facility at 17° C./minute (30° F./minute). Details of the facility and procedure have been previously published (Stokes, E. H., "Prediction of Ply Lift Temperature in Two Dimensional Polymeric Composites," in: *Proceedings JANNAF-RNTS Meeting,* Silver Spring, Md., edited by M. J. Paul, CPIA Pub. 526, October, 1989, pp. 525–532). All specimens were immersed in 22° C. distilled water until their weight equilibrated prior to testing.

Microscopic Examination

Specimens from each cure process were mounted, polished, and examined microscopically using metalographic techniques.

Results

Physical Properties

The laminate data suggested that the variation in porosity ranged from 4 to 10%. Tables 1 and 2 show the relationship between the processing variables and the resulting porosity as determined by the subtraction of fiber and resin volumes from bulk density data. Void content was primarily controlled by hold temperature, dwell time, and the time pressure was applied. Maximum pressure had little effect on void content.

Hot/Wet Performance

Only two of the panels, the two with the lowest porosity (cure cycles #4, 4.10% porosity and #9, 3.27% porosity) were determined to have delaminated.

TGA and DSC

Thermogravimetric analysis curves exhibited a knee and an increased rate of weight loss at approximately 260° C. for specimens from material before post curing. Material run after post curing gave no increased rate of weight loss at this temperature. This was probably due to additional crosslinking and the evolution of water.

Mechanical Properties

Short beam shear and compressive strength data indicated that between 7 and 10% void content, both compression and shear performance are slightly above those in the 3.3–5.5% range. Therefore, although other factors in the cure may affect mechanical performance, it is. apparent that maintaining void content in the 7–10% range is not detrimental to the mechanical integrity of the material. Microcracking (which can be seen in FIG. 19) appears to be eliminated in the material of the present invention. It is believed that the microcracking is caused by shrinking of the resin. Perhaps the increased porosity of the material of the present invention relieves some of the stresses caused as the resin shrinks, thus preventing microcracking.

Permeability and Thermal expansion

Figure 16:
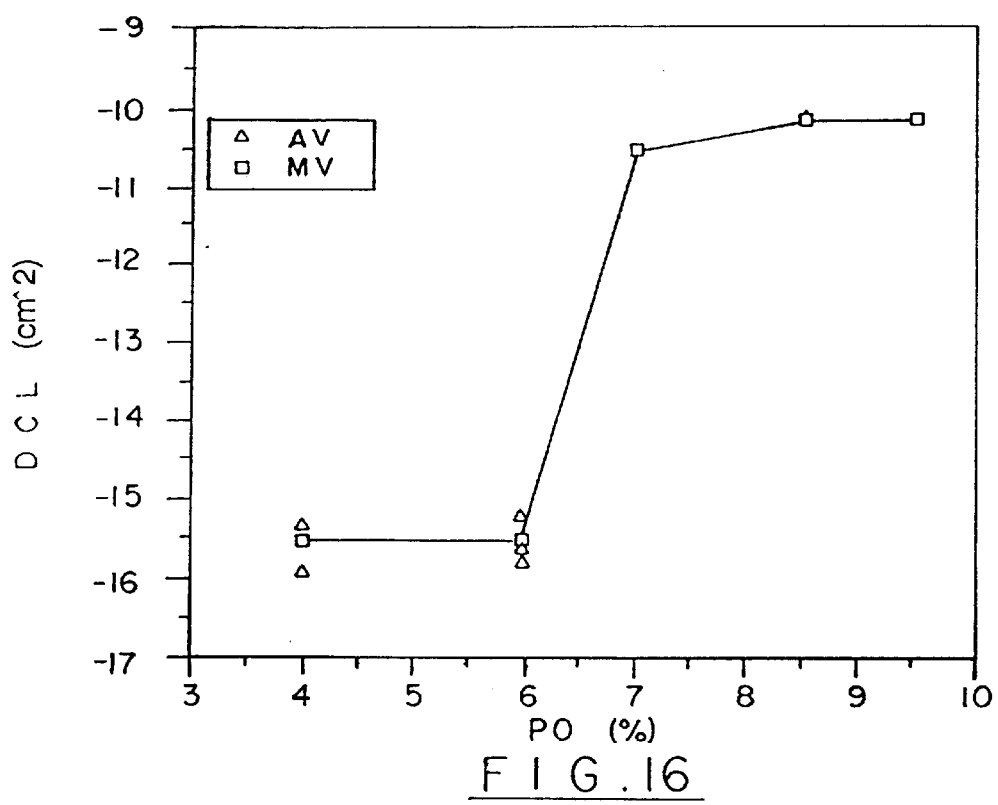
FIG. 16 is a graph showing the room-temperature across-ply permeability as a function of porosity, with "DCL" indicating the log of Darcy's constant, "PO" indicating porosity, "AV" indicating actual value, and "MV" indicating mean value.
Figure 17:
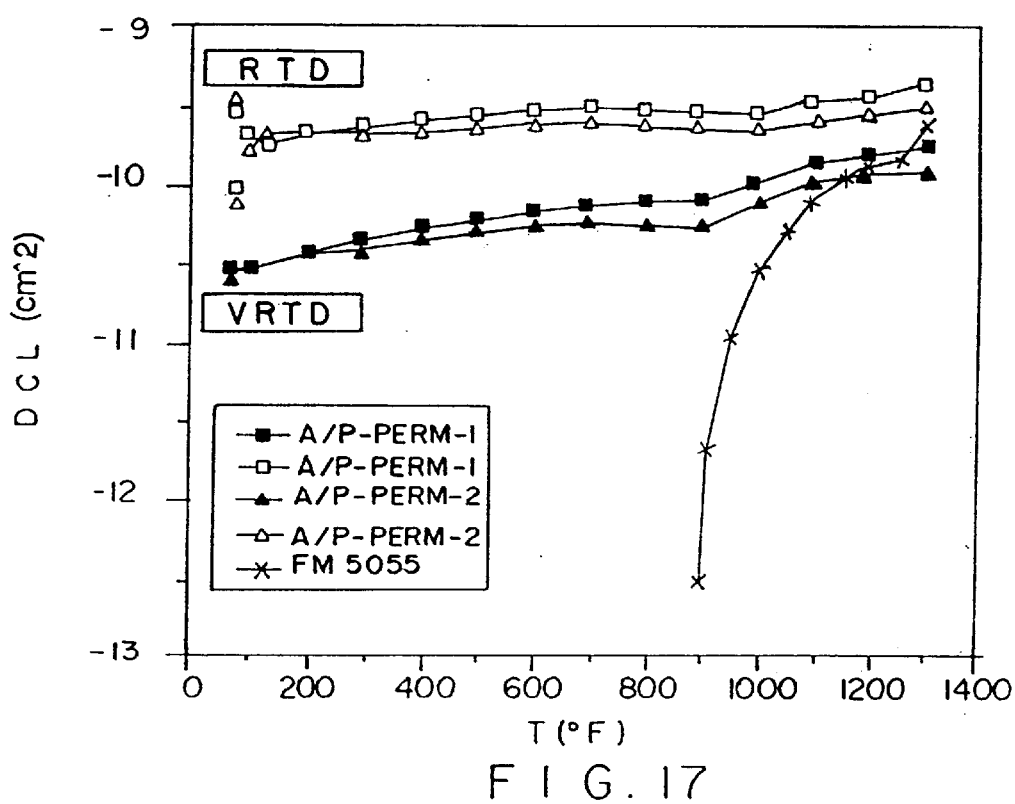
FIG. 17 is a graph showing the elevated-temperature across-ply gas permeability of PAN-based material #11, in which "RTD" indicates RT return data, "VRTD" indicates virgin RT data, the solid symbols represent Darcy's equation, and the hollow symbols represent Forchheimer's equation.
Figure 18:
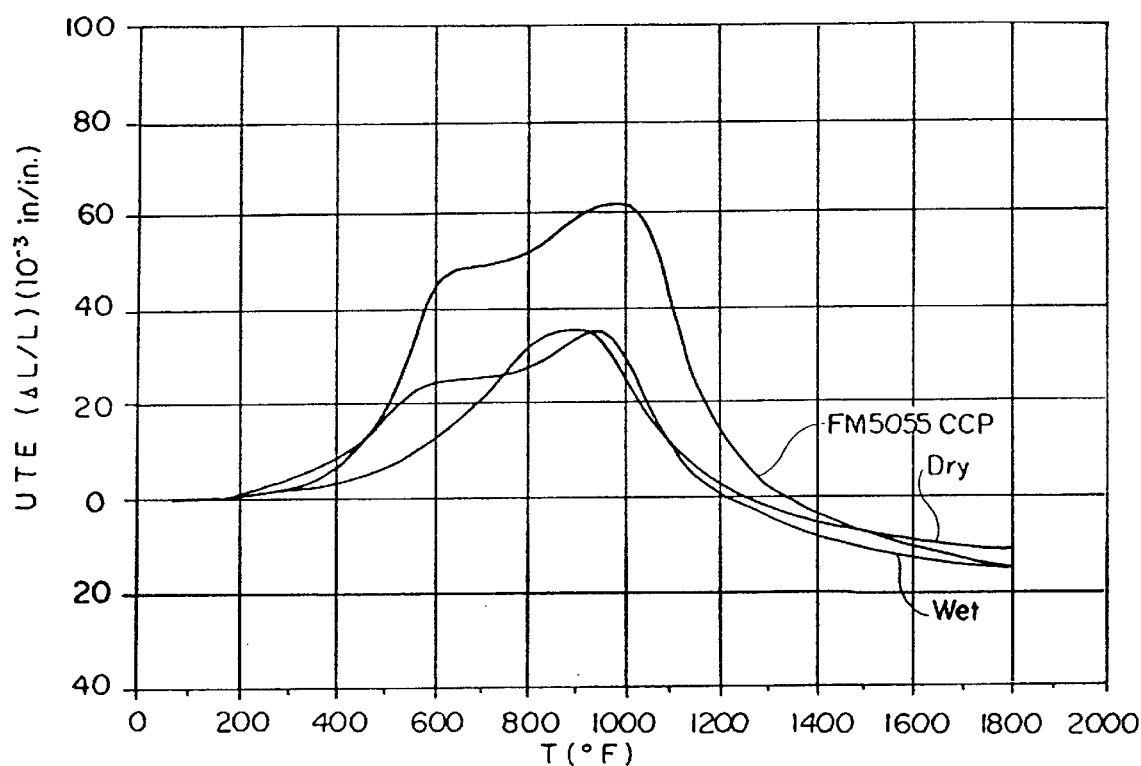
FIG. 18 is a graph showing across-ply thermal expansion of wet and dry PAN-based graphite/phenolic material at 10° F./second, in which "UTE" indicates unit thermal expansion, the specimen diameter is 0.25 inches, and the heating rate is 10 degrees Fahrenheit per second, "Dry" indicates the across-ply thermal expansion of dry PAN-based graphite/phenolic material, "Wet" indicates the across-ply thermal expansion of wet PAN-based graphite/phenolic material, and "FM 5055 CCP" indicates the across-ply thermal expansion of the PAN-based graphite/phenolic material as received.

The room-temperature across-ply permeability of five of the cure variants as a function of porosity (by subtraction) can be seen in FIG. 16. The data indicates that there was a sharp break in the permeability of these materials between 6 and 7% porosity. The elevated-temperature across-ply permeability of the nominal material (#11) as a function of temperature can be seen in FIG. 17 (where "RT" is room temperature). Standard-density rayon-based material data is included for comparison. The high as-cured across-ply permeability dominates the response of the material throughout the range of temperatures tested. The small increase in permeability with temperature is probably due to the pyrolysis weight loss of and development of pore structure in the cured phenolic resin. The across-ply thermal expansion of wet and dry nominal material can be seen in FIG. 18. Standard-density rayon-based FM 5055 is plotted for comparison purposes on the same graph. The lower peaks for the PAN material as compared to the rayon are indicative of the higher permeability of the former. Both first and second peaks are thought to be due to internal gas pressure induced expansion of the material. The lack of a first hump with the dried material is characteristic of phenolic materials and is thought to be due to the loss of the volatile components of the composite that give rise to the internal pressure which generates this first peak.

Plylift Testing

The results of plylifting testing on five of the materials with varying ascured porosity are shown in Table 4. Only the 4 and 6% materials, the two materials with documented low across-ply permeability, exhibited plylift although not consistently. The temperatures at which they lifted, i.e. 236 and 247° C., are below the temperatures normally exhibited by rayon-based low-fired standard density materials, 260–285° C. This would imply that the across-ply tensile strength of these materials is somewhat lower at these temperatures than for low-fired rayon-based composites (Stokes, E. H., "Prediction of Ply Lift Temperature in Two Dimensional Polymeric Composites," in: *Proceedings JANNAF-RNTS Meeting*, Silver Spring, Md., edited by M. J. Paul, CPIA Pub. 526, October, 1989, pp. 525–532; Stokes, E. H. and Koenig, J. R., "Experimental Replication of the Ply Lift Event in Carbon Phenolic Composites and Investigation into Factors of Causation," in: *Proceedings JANNAF-RNTS Meeting*, MSFC, Ala., edited by D. L. Becker, CPIA Pub. 496, October, 1988, pp. 201–209). This agrees with the commonly observed phenomena that graphite-based composites have weaker resin-to-fiber strengths than lower fired carbon-based systems owing to the higher concentration of functional groups on the surface of fibers of the latter group. There were clear differences in the void location and content between the 6 and 7% materials (see FIGS. 19 and 20). The 7% material had large irregular-spaced open pores between plies and globular-shaped voids within the fiber bundles as can be seen in the photomicrographs. On the other hand, the 6% material had regularly spaced planar within-yarn bundle cracks with dimensions in the yarn and across-ply directions. Some interlaminar spherical-shaped pores were also visible but these were distinctly smaller than those observed in the 7% material.

Figure 19:
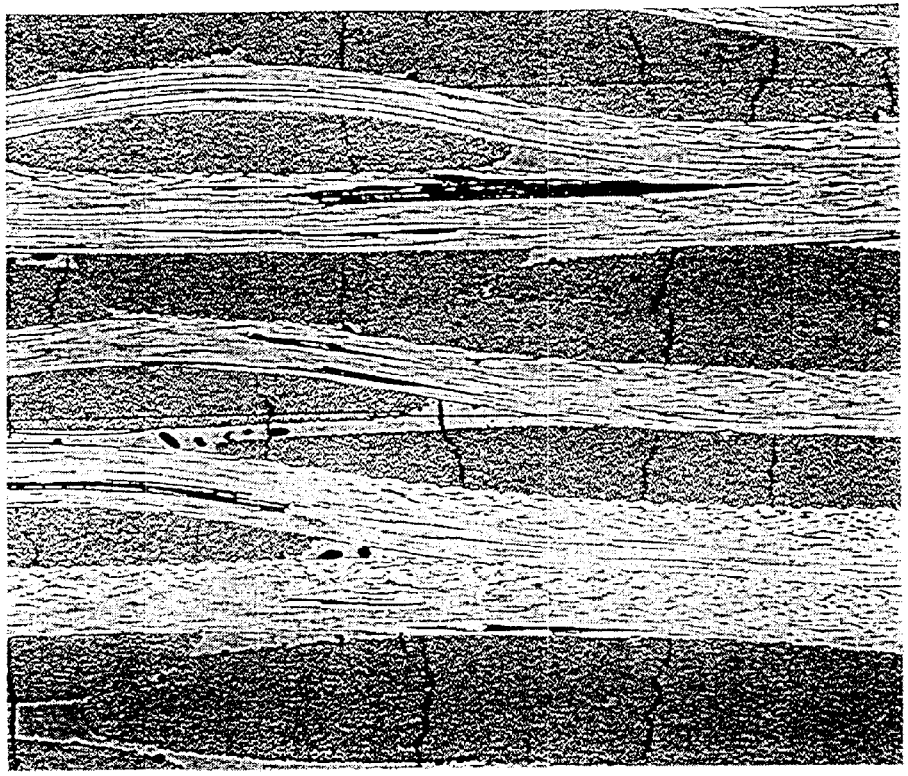
FIG. 19 is a photomicrograph showing a 6% porosity material made with the apparatus and method of the present invention, but with pressure applied prematurely (before the resin gelled)
Figure 20:
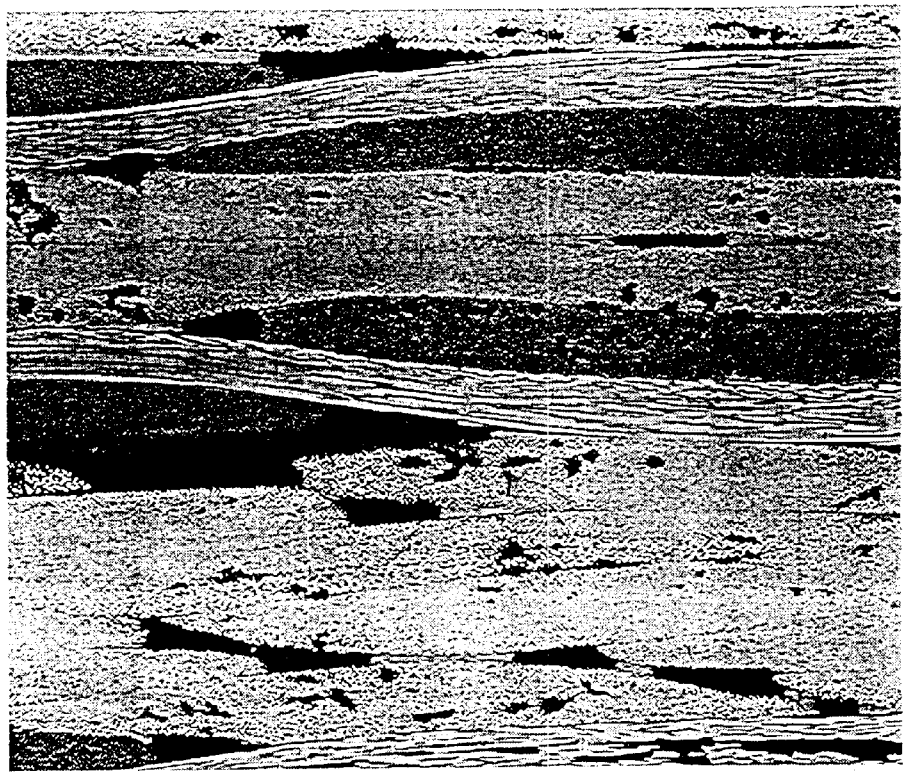
FIG. 20 is a photomicrograph showing a 7% porosity material made with the method of the present invention.

FIG. 19 is a photomicrograph showing a 6% porosity material made with the apparatus and method of the present invention, but with pressure applied prematurely (before the resin gelled), while FIG. 20 is a photomicrograph showing a 7% porosity material made with the apparatus and method of the present invention, with no pressure applied until after the resin gelled. While the percentage of porosity is similar in these two materials, the across-ply permeability of the 7% material is much higher, resulting in no ply lift when the 7% material is heated to temperatures above 500° F. It is believed by the present inventors that even a material with a relatively low porosity produced by the apparatus and method of the present invention may have sufficient across-ply permeability to not exhibit ply lift, even when heated to temperatures above 500° F. or even above 1000° F. The present inventors believe that the across-ply permeability of the material of the present invention is what allows it to be subjected to extreme heat without exhibiting ply lift, and that the material of the present invention can be heated to higher temperatures without exhibiting ply lift than similar materials which may have higher porosity, but which do not have the high across-ply permeability of the present invention.

The across-ply permeability of the present invention preferably has a Darcy's constant of at least $10^{-15}$ cm$^2$; more preferably, it has a Darcy's constant of at least $10^{-14}$ cm$^2$; most preferably, it has a Darcy's constant of at least $10^{-13}$ cm$^2$.

Open Porosity

Figure 21:
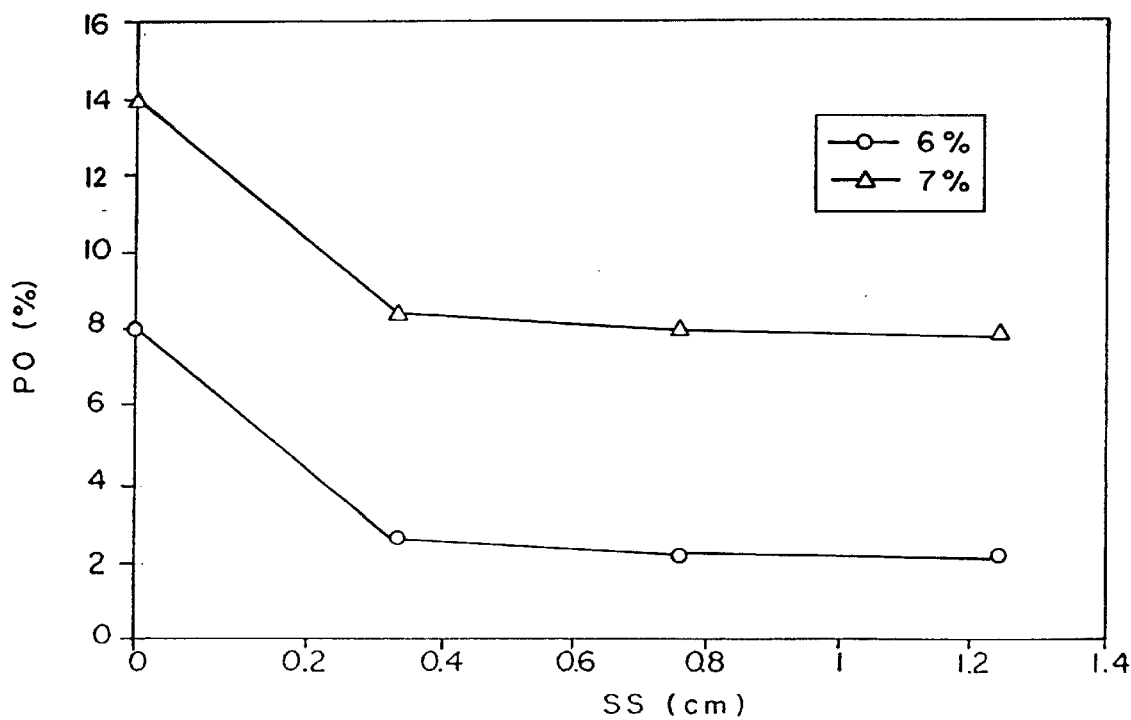
FIG. 21 is a graph showing open porosity, "PO", versus specimen size, "SS", as determined by helium pycnometry.

FIG. 21 shows the results of Helium Pycnometry tests on the 6 and 7% materials. Cube-shaped samples of various sizes were run and the "specimen size" axis on the graph refers to the length of one side of the cube. In addition, powdered material was run and is plotted at a specimen size of zero. The porosities reported for the powder are approximations of the total porosity in the material (closed and open), whereas, at higher sample sizes the test measures the volume of the material that helium can access from the exterior surfaces of the specimen, i.e., open porosity. The higher porosities with smaller sample sizes is indicative of the dimensions and volume of closed porosity with the sample that is opened as a result of the reduction in the sample size.

Conclusions

BASF G30-500-8HS/506 graphite/phenolic can be controllably processed to a wide range of porosities.

Dwell time, hold temperature, and pressure application point during the second hold in the cure cycle are the critical variables with respect to the permeability and porosity of the resulting part.

Porosity and permeability appear to control the response of the composite with respect to the occurrence of plylift.

A repeatable process for generating an acceptable material for use on the Nose Cone of the External Fuel Tank of the Space Shuttle has been developed. The material withstands the structural loads and high aerodynamic heating environment encountered in this environment.

The approach of processing high flow carbon/phenolic laminates under low pressure may offer benefits in other applications such as rocket nozzles and exit cones.

Post Testing Development

Subsequent to this program, the fundamental process characterized herein has been scaled to a full scale Nose Cone (53" diameter×30" high) (see Example 3). The Nose Cone has passed full scale static, vibration, and acoustic testing and sections removed from the cone have successfully passed wind tunnel testing. Several Nose Cones have been cut-up and tested to prove that the process is repeatable. The graphite/phenolic Nose Cone has been approved for implementation on the External Tank and implementation is in progress.

EXAMPLE 2

Flat Laminate

Eight plies of an 8-harness satin fabric woven from Toho G-30/500-3K graphite fiber were impregnated with Cytec 506 phenolic resin in a ratio of 61–65% by weight graphite fiber and 35–39% by weight phenolic resin.

EXAMPLE 3

Conical Nose Cone

Eighteen plies (see Table 1A for lay-up pattern) of an 8-harness satin fabric woven from Toho G-30/500-3K graphite fiber were impregnated with Cytec 506 phenolic resin in a ratio of 61–65% by weight graphite fiber and 35–39% by weight phenolic resin.

The resin-impregnated fiber laminate was then placed in apparatus similar to apparatus 100 shown in FIGS. 5 and 7, but with a graphite/epoxy composite base in the shape the nose cone in place of base 111. The cure cycle of Table 3 was then performed, followed by the post cure cycle of Table 3A.

The laminate after the cycle of Table 3A had the following characteristics:

Average thickness: 0.23–0.25 inch;

TABLE

Results of Ply Lift Testing

| Specimen Data | | | Specimen Size | Darcy's | Log of Darcy's | Ply Lift Data | | |
| --- | --- | --- | --- | --- | --- | --- | --- | --- |
| Material Porosity | Specimen Number | Run Number | (dia. × thick.) (inches) | Constant (cm 2) | Constant at 150 psig | TG Temp. (° F.) | Ply Lift Temp. (° F.) | Lift Intensity (mils) |
| 4% | PL-3 | 6-31-33 | 1.0058 × .2245 | 3.45E−16 | −15.46 | 375 | 451 | 65.5 |
|  | PL-4 | 6-31-35 | 1.0071 × .2230 | 1.32E−16 | −15.88 |  | No Lift |  |
| 6% | PL-9 | 6-32-9 | 1.0049 × .2242 | 5.03E−16 | −15.23 |  | No Lift |  |
|  | PL-10 | 6-32-13 | 1.0037 × .2250 | 1.89E−16 | −15.72 | 400 | 477 | 29.5 |
| 7% | PL-1 |  | Not Tested |  |  |  | No Lift |  |
|  | PL-2 |  | Not Tested |  |  |  | No Lift |  |
| 8.5% | PL-7 | G477-140 | 1.0078 × .2300 | 5.98E−11 | −10.22 |  | TBD |  |
|  | PL-8 | G477-141 | 1.0062 × .2320 | 7.39E−11 | −10.13 |  | TBD |  |
| 9.5% | PL-5 |  | Not Tested |  |  |  | No Lift |  |
|  | PL-6 |  | Not Tested |  |  |  | No Lift |  |

Note:
all specimens except PL-7 and PL-8 were tested following equilibration of weight in 72° F. distilled water.

The resin-impregnated fiber laminate was then placed in apparatus 100 shown in FIGS. 5 and 7. The cure cycle of Table 3 was then performed, followed by the post cure cycle of Table 3A.

The laminate after the cycle of Table 3A had the following characteristics:

Average thickness: 0.102–0.111 inch;
Density: 0.1.4–1.5 g/cc;
Porosity: 7–10 by volume;
Fiber volume: 56–62%
Average compression strength at room temperature (about 77° F.): 60.7 KSI;
Average compression strength at 500° F.: 44.3 KSI;
Average interlaminar shear strength at room temperature: 4.89 KSI;
Average interlaminar shear strength at 500° F.: 3.30 KSI;
Average in plane shear strength at room temperature: 10.1 KSI; and
Average in plane shear strength at 500° F.: 5.45 KSI.

Density: 1.4–1.5 g/cc;
Porosity: 7–12 by volume;
Fiber volume: 56–62%;
Average compression strength at room temperature (about 77° F.): 50.2 KSI;
Average compression strength at 500° F.: 48.0 KSI;
Average short beam shear strength at room temperature: 4000 psi; and
Average short beam shear strength at 500° F.: 3200 psi.

Composition

The composition of the present invention is different from that typically used in carbon fiber reinforced phenolics in that the fiber is a high strength fiber, as opposed to a fiber which has very high thermo-oxidative stability. Also, the resin is more suitable for high strength applications than a typical phenolic. The normal ratio of fiber to resin (65–75%/25–35% by weight) is typical in the industry. The combination of the material of the present invention with the processing discussed herein is believed to be novel and inventive.

TABLE 5

Wind Tunnel Test Conditions

| Test | Heating Rate (BTU/Ft²/Sec.) | Exposure Time (sec.) | Max. Temp. Range (° F.) |
|---|---|---|---|
| Max. Gradient | 15 | 89 | 890–940 |
| Max. Backface | 7.8 | 367 | 940–990 |
| Nose Cone Fairing | * | * | 1110 |

*Data not available

The existing material used on the ET is an aluminum structure covered with a silicone-based ablator (heat shield) material. The ablator is very expensive to make and apply. For the parts evaluated to date, the graphite phenolic composite material of the present invention shows a significant recurring cost savings over the ablator-covered metal structure.

Processing

The combination of the materials and the processing is one of the advantages of the present invention. The processing creates a microscopic laminate structure which allows entrapped moisture to vent out of the laminate without degrading mechanical properties. This processing is possible with any fiber/resin system which produces volatiles as part of the curing process. The escape path of these volatiles leaves an interconnecting network of pores which allow the laminate to "breathe", or vent off absorbed moisture.

Phenolics are suitable to this process because they are "condensation polymers"; that is, the curing reaction produces volatiles (chemical reactants "A" and "B" combine to produce "C" (the cured resin) and "D" (the volatile species, e.g. water vapor)). Polyimides are another class of resins typically used in composite laminates which are condensation polymers.

In addition, the process could be used with resins which do not give off volatiles as part of the curing reaction if a volatile component (e.g. a solvent) is added to the resin prior to cure. Solvated polymers are commonly used to prepare "prepregs," which are filamentary tapes or fabrics coated with resin. These prepregs are laid up ply by ply to form a laminate, which is subsequently cured.

Absorbed moisture is a problem because even if a laminate is dried thoroughly in the cure cycle or thereafter, the polymer matrix will absorb moisture from the air over time. This is an inevitable consequence of being exposed to humid air. Therefore, when the laminate is heated above the boiling point, the entrapped moisture exerts its vapor pressure internally on the laminate. When the vapor pressure of the laminate exceeds the strength of the resin holding the plies of the laminate together, the laminate will separate (there is some minimum thickness required for the phenomenon to manifest itself, below this thickness (typically 0.1" to 0.2"), the permeability of the laminate is sufficient to relieve the vapor pressure). This phenomenon limits the maximum use temperature in laminates.

In regard to the apparent discrepancy regarding the laminates which were subjected to 135 psi but did not subsequently undergo delamination, the following explanation is provided. In all cases, the laminates were subjected to the "hold temperature" for the "dwell time" (in Table 1 of the disclosure) before the application of pressure. Testing has shown that 15 minutes at 240° F. (panels 1, 6, and 12) or 78 minutes at 200° F. (panel 7) is sufficient to "gel" the resin, or effectively raise the viscosity so high that the resin does not "flow", upon the application of pressure, to eliminate the network created by the escaping volatiles. Therefore, these laminates had the critical microstructure in place before the application of pressure, and the pressure did not affect it. This was evident both in unaided and microscopic visual examination. The higher temperature is preferred, as the shorter dwell time reduces cure time.

Extensive testing has been done to prove the process is repeatable and meets all performance requirements. The following is a summary of this testing.

Testing

All testing discussed below has been performed on panels or components which have been fabricated with the final optimized material/process discussed above.

Wind Tunnel Testing

Figure 4A:
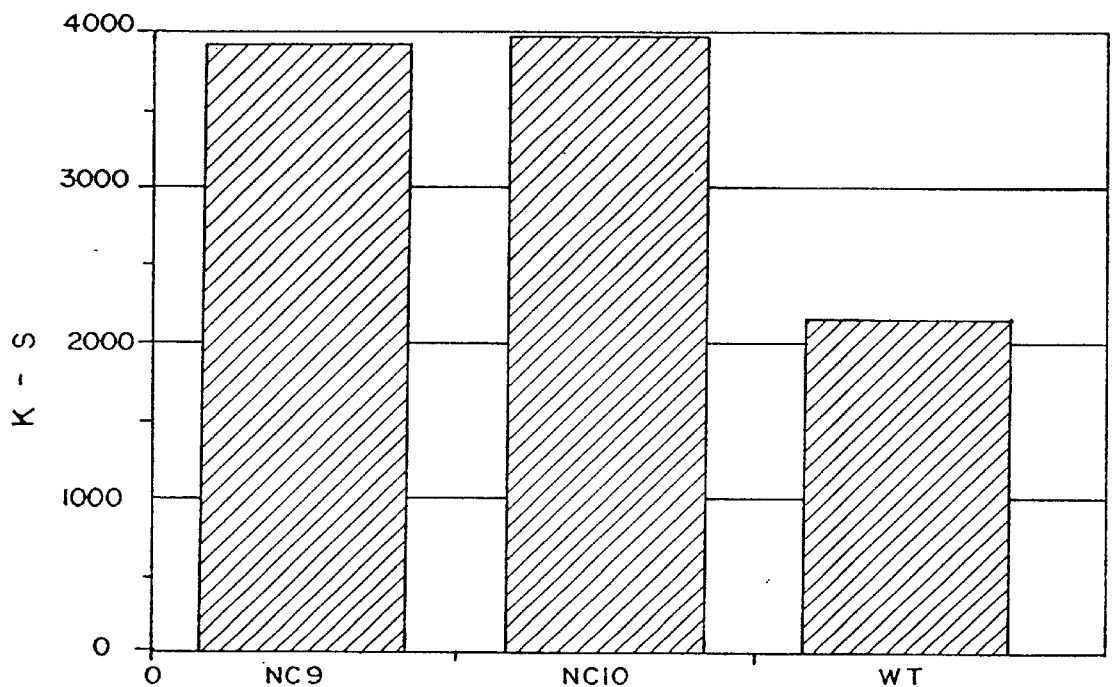

One of the most critical tests for the material was the wind tunnel. The new material has demonstrated the ability to withstand heating rates of 14 BTU/ft² sec and temperatures of almost 1000° F. and above through wind tunnel testing. Panels fabricated with the new material and process, which were moisture saturated in a humidity cabinet, performed extremely well in this testing and experienced no ply lift. The test conditions are shown in Table 5 (in which "Max. Gradient" refers to maximum thermal gradient and "Max. Backface" refers to maximum backface temperature) and the temperature profiles of the test panels are shown in FIGS. 2 and 3. The testing for the maximum temperature case is considered to be more severe than flight. Even after exposure to temperatures above 700° F. (the approximate decomposition temperature of the phenolic resin) for several minutes, the laminate material still retained structural integrity. Cut-up tests of post-tested panels showed that over 50% of mechanical properties remained (shown in FIGS. 4A and 4B). Other testing showed that up to about 70% of mechanical properties remained in some panels.

High Temperature Compression Panel Testing

Figure 6:
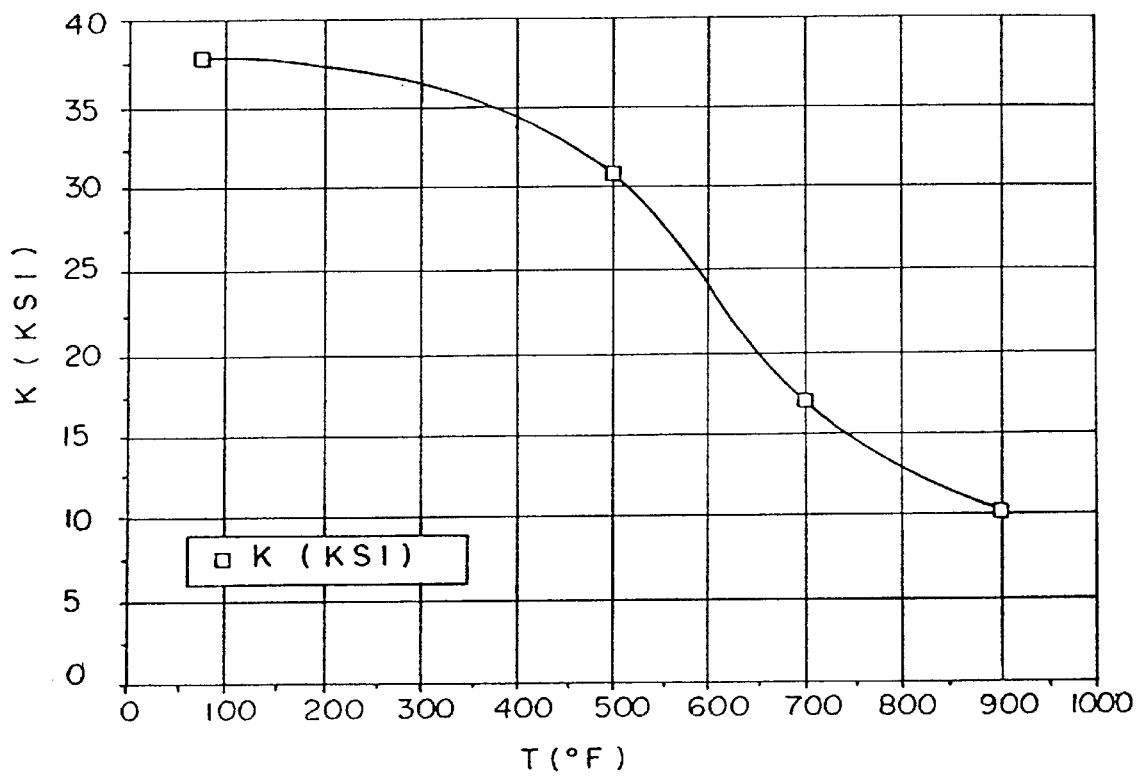
FIG. 6 is a graph showing the high temperature compression panel test program results.

The high temperature compression panel test program assessed the response of the material to the: combined effects of temperature, moisture and structural loads on the laminate material. In this program, 5"×10"×0.25" (18 ply) quasi-isotropic graphite/phenolic panels were moisture saturated, then exposed to temperatures up to 900° F. and loaded in compression to failure. The specimens were heated to test temperature at 200–400° F./min. The test procedure made use of the NASA 1092 compression after impact specimen and test fixture. Quartz lamps were used to heat the specimens. The results of this test program are shown in FIG. 6. This data shows that the laminate retains over 25% of its structural room temperature integrity at 900° F.

Full Scale Nose Cone Testing

External Tank (ET) composite nose cones, fabricated with the graphite/phenolic material discussed herein, have been subjected to full scale dynamic, acoustic and damage tolerance tests. For the damage tolerance test, the nose cone was impacted at an energy level of 20 ft/lbs at the four highest stress locations on the nose cone, then statically tested to 300% of limit load without failure. Post test NDE indicated no damage growth during testing. Full nose cones were also tested to the vibration levels and acoustic level experienced by the nose cone. Post test NDE showed no degradation from the vibration or acoustics.

The nose cones tested were of a standard size for the nose cones of the ET, 30" high with a base 58" in diameter. The nose cones tested were made of 65–75% by weight Toho G-30/500 fiber and 25–35% by weight of Cytec 506 resin. The material was produced by the method of Table 3, and had an average thickness of 0.23–0.25 inches. The porosity of the material was 7–12%.

Fracture Testing

Figure 8:
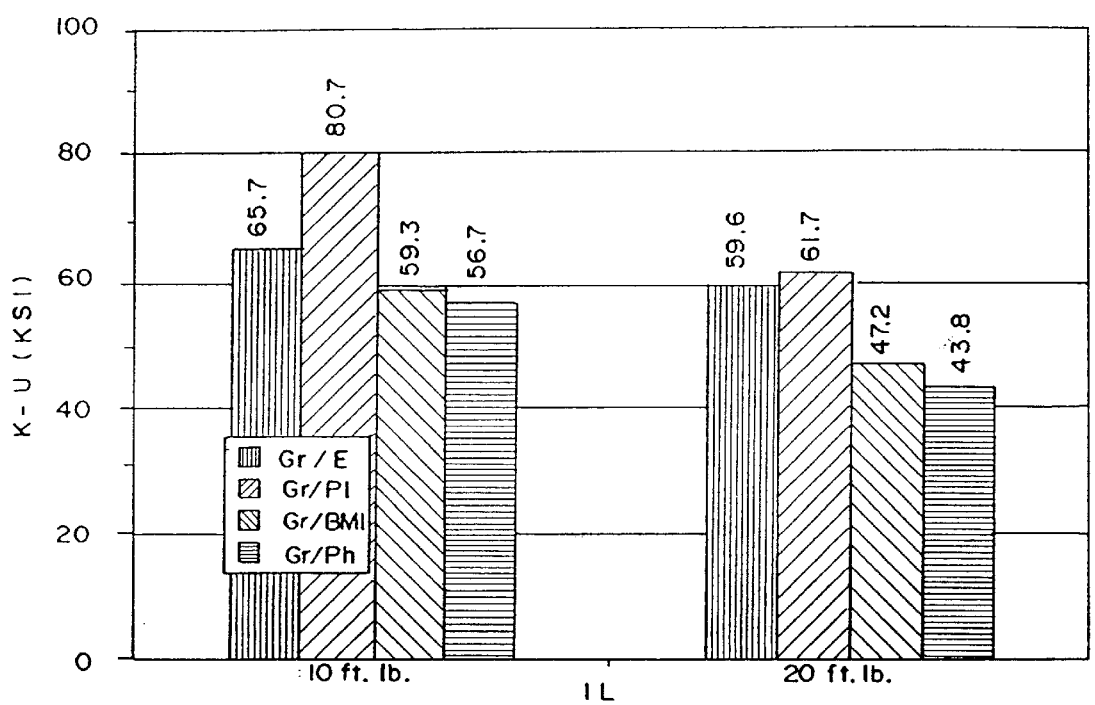
FIG. 8 shows the retention of strength for compression after impact testing of four materials (Gr/E is a composite of graphite fiber impregnated with epoxy resin, Gr/PI is a composite of graphite fiber impregnated with polyimide resin, Gr/BMI is a composite of graphite fiber impregnated with bismaleimide resin, and Gr/Ph is a composite of graphite fiber impregnated with phenolic resin) , wherein "K-U" refers to undamaged strength and "IL" refers to impact level in foot pounds.
Figure 9:
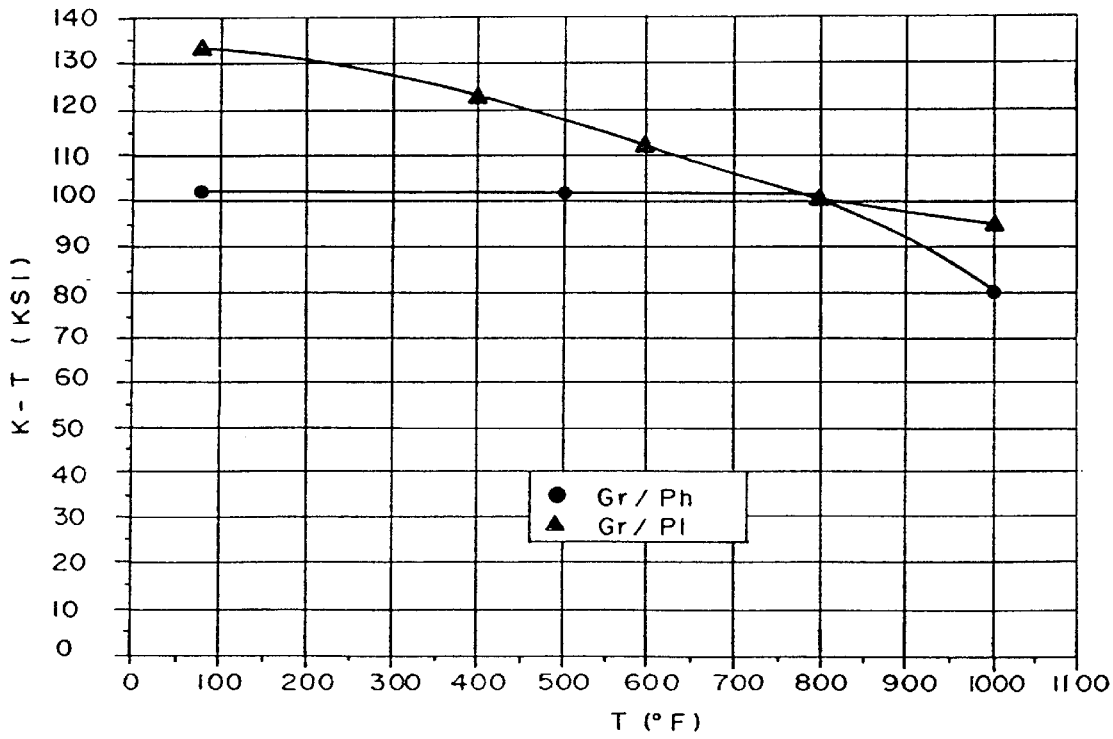
FIG. 9 is a graph showing tensile strength ("K-T") versus temperature for Gr/Ph (a composite of graphite fiber impregnated with phenolic resin) and Gr/PI (a composite of graphite fiber impregnated with polyimide resin)
Figure 10:
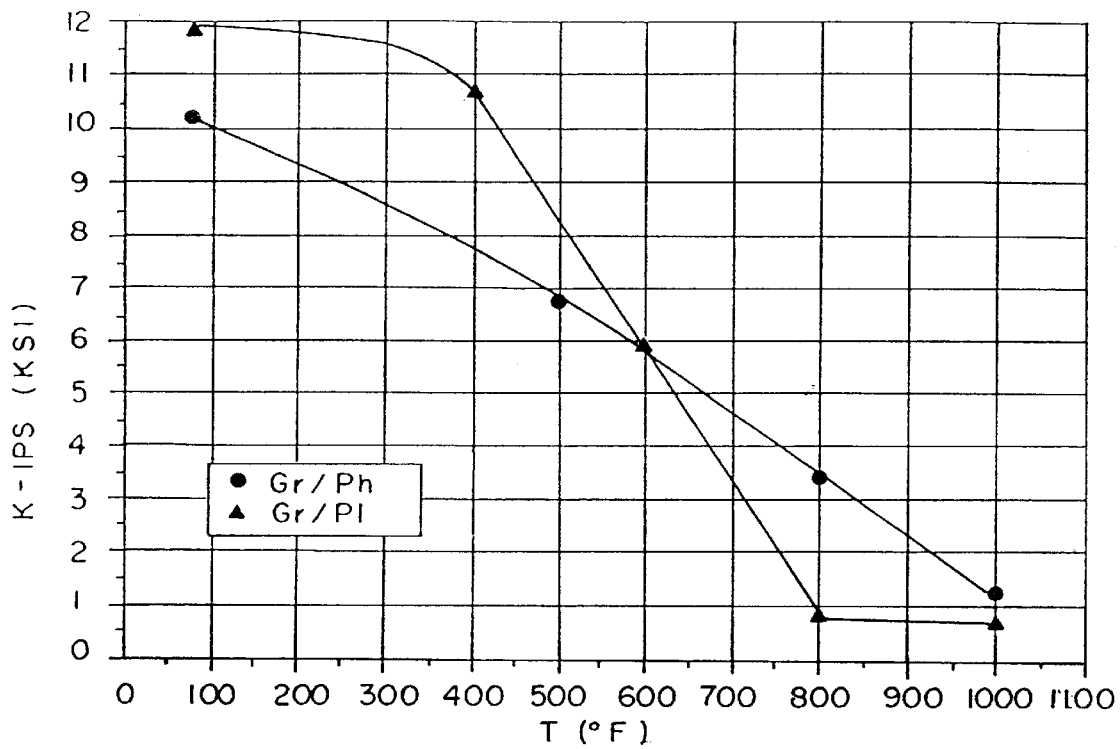
FIG. 10 is a graph showing in-plane shear strength ("K-IPS") versus temperature for the materials of FIG. 9.
Figure 11:
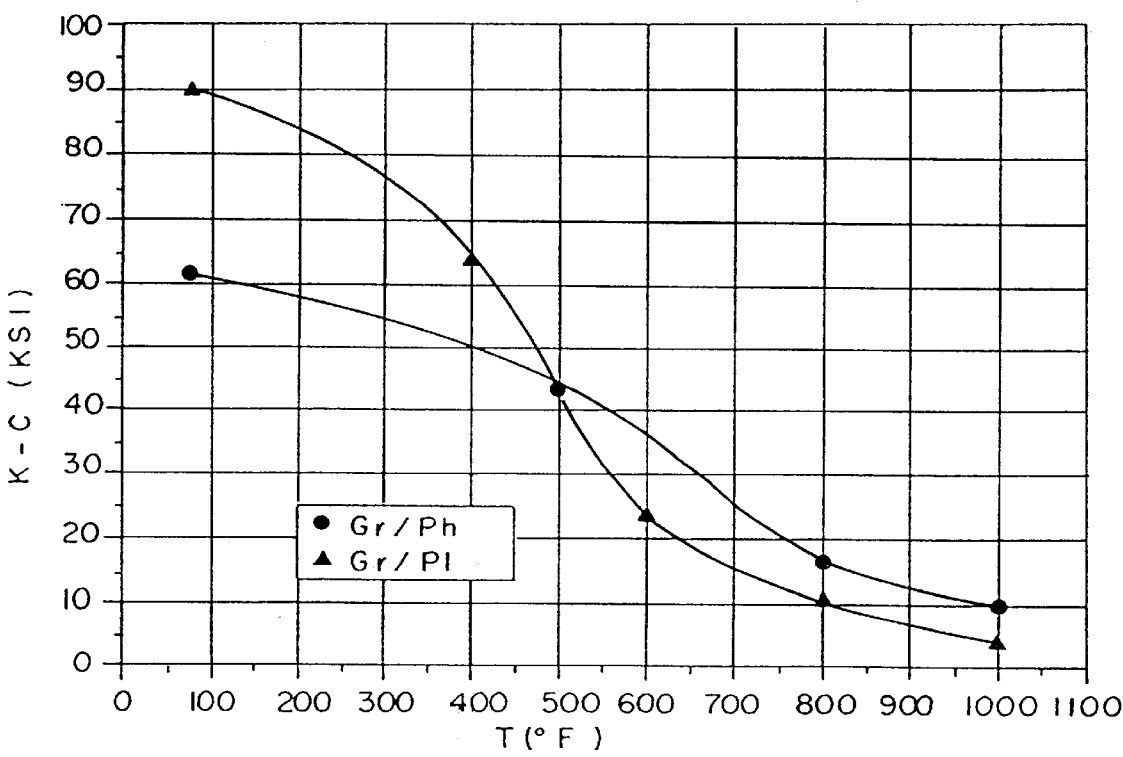
FIG. 11 is a graph showing compression strength ("K-C") versus temperature for the materials of FIG. 9.
Figure 12:
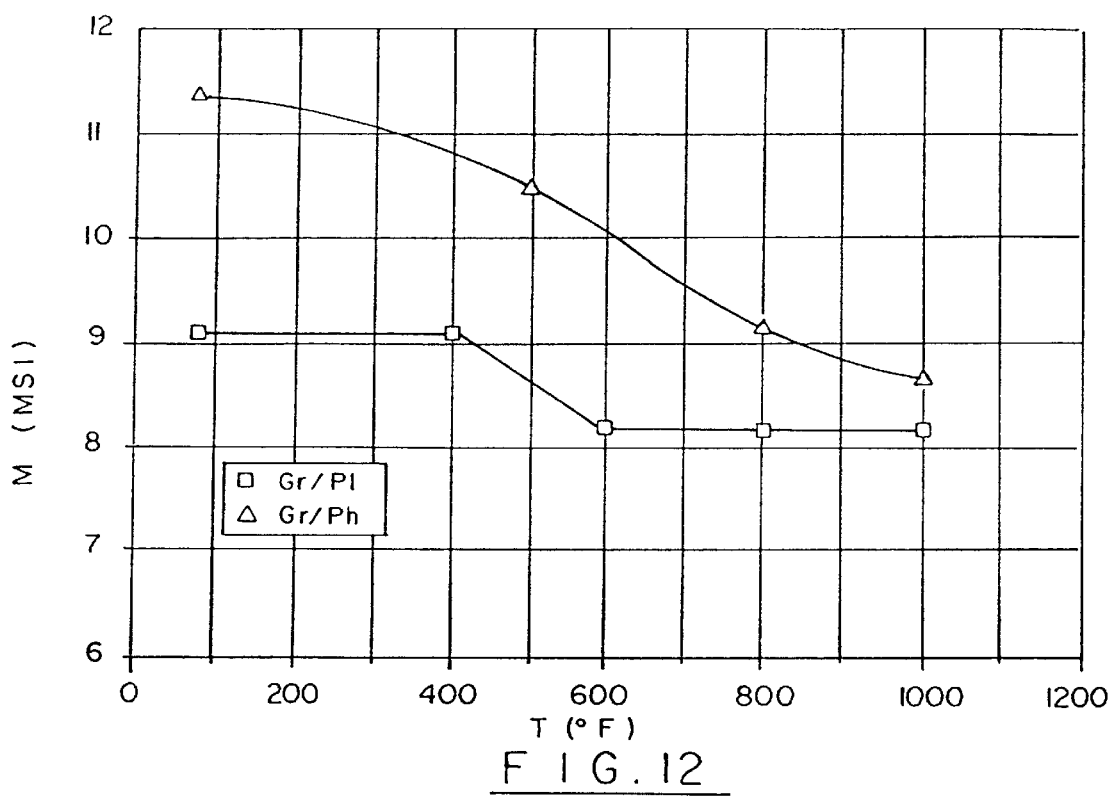
FIG. 12 is a graph showing tensile modulus ("M") versus temperature for the materials of FIG. 9.

Extensive fracture testing has also been done on the material. Although phenolics are notoriously brittle, the material developed herein is amazingly damage tolerant. FIG. 8 shows a comparison of retention of strength after various impacts. Although not as tough as epoxies, the phenolic material does withstand impact damage nearly as well as the standard BMI materials. In addition, the graphite/phenolic material has a $G_{IC}$ (fracture toughness) of 0.96 in-lb/in$^2$ compared to 1.1 in-lb/in$^2$ for woven graphite/epoxy.

Mechanical Property Testing

The graphite/phenolic material shows outstanding high temperature mechanical properties for a phenolic matrix laminate. FIGS. 9 through 12 show the mechanical properties of the graphite/phenolic of the present invention compared to a graphite/polyimide constructed of the same fiber and fabric and processed by conventional prior art techniques. The graphite/phenolic material is very comparable at lower temperatures and exceeds the polyimide at temperatures above about 600° F. However, the phenolic processes at much lower temperatures (350 vs. 600° F.) and much lower pressures (5 vs. 200 psi).

Cryogenic Interface Testing

A full scale nose cone successfully passed a cryogenic interface test. In this test, the cone was mounted to a simulated liquid oxygen tank (see FIG. 15) and the tank simulator was chilled to around −320° F. with liquid nitrogen. Since the tank simulator is made of aluminum and has a much higher coefficient of thermal expansion than the cone (13×10$^{-6}$ in/in° F. vs. 1.0×10$^{-6}$ in/in° F.), significant loads were induced in the part.

Ply Lift/Permeability Testing

Figure 13:
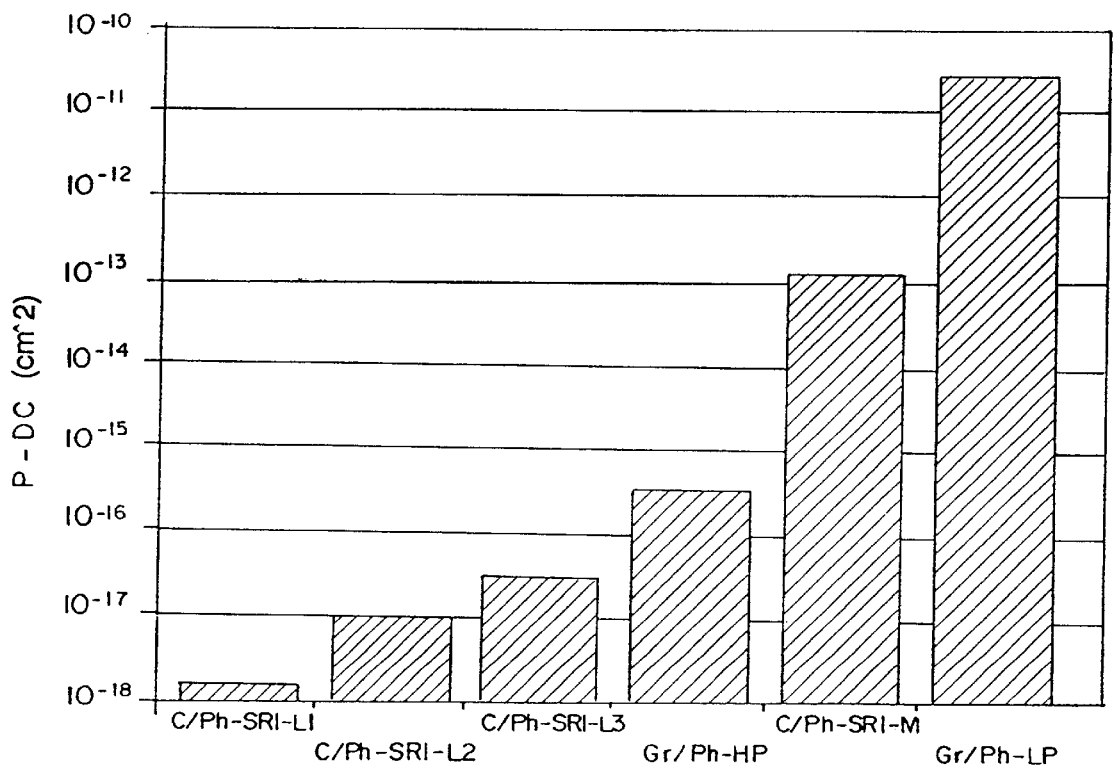
FIG. 13 is a comparison of across-plane graphite/phenolic permeability with in-plane carbon/phenolic permeability, in which "C/Ph SRI-L 'X'" specimens were removed from solid rocket nozzles, "Gr/Ph-HP" represents standard industry processing of carbon (graphite)/phenolic laminates ("P" refers to pressure), "C/Ph SRI-M" refers to specimens removed from solid rocket nozzles, and "Gr/Ph-LP" refers to the graphite/phenolic laminate material ("P" refers to pressure) of the present invention, and "P-DC" refers to Permeabililiy-Darcy's constant; documented ply lift occurred in the first four specimens on the left, while the fifth specimen from the left represents the maximum in-plane permeability of 78 carbon/phenolic specimens tested.

At the request of NASA/MSFC, two test programs were initiated to better understand the performance of the new material system developed. FIG. 13 shows a comparison of the new system as compared with other graphite/phenolic and carbon/phenolics. This testing proved that the across-plane permeability of the new graphite/phenolic is orders of magnitude higher than the across-plane permeability of other graphite/phenolics. It is also significantly higher than the in-plane permeability of carbon/phenolics. (The carbon/phenolics in this chart are used for rocket motor nozzles and have virtually zero across-plane permeability). Since permeability has been shown to be critical to high temperature performance and resistance to ply lift, the new material has excellent performance.

An associated test tests directly for "ply lift" by rapidly heating up saturated laminates and measuring across-ply expansion. The new material passed with no delamination.

Figure 14:
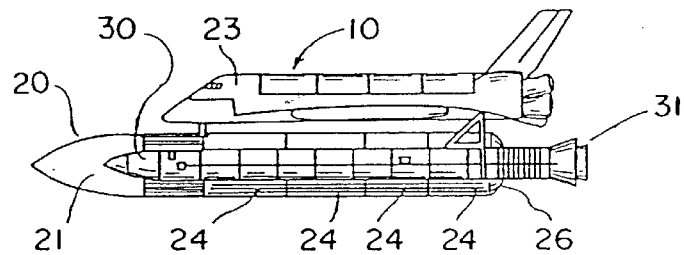
FIG. 14 shows the space shuttle.
Figure 15:
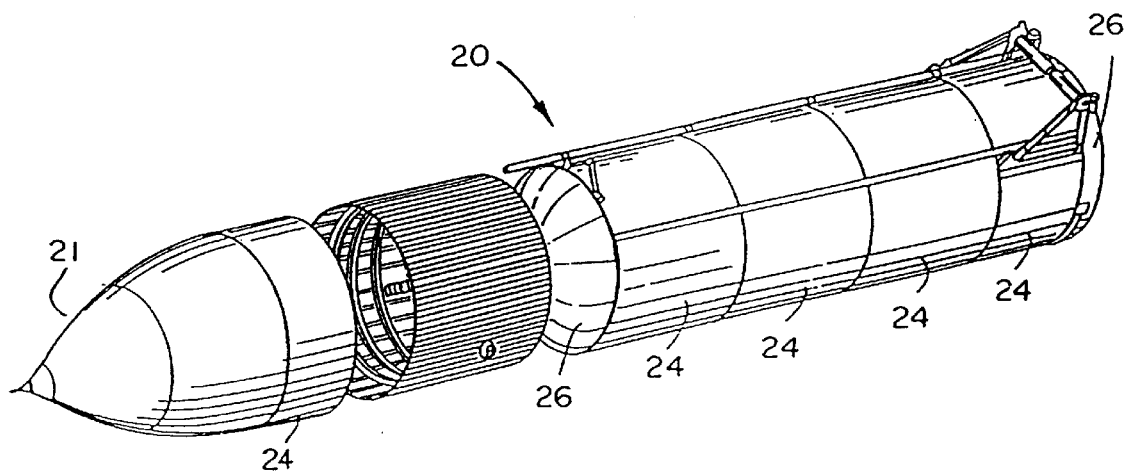
FIG. 15 shows the external tank of the space shuttle

FIG. 14 shows the space shuttle 10, and FIG. 15 shows the external tank (ET). Space shuttle 10 includes a reusable orbiter 23 and expendable solid rocket motors 30 (only one of which is shown in FIG. 14) and external tank 20. External tank 20 comprises a number of barrel sections 24 and dome sections 26 usually made of aluminum. The nose cone 21 for the External Tank 20 can be made of the graphite/phenolic composite material of the present invention. Also, the nozzles 31 of rocket motors 30 can be made of the composite material of the present invention.

Lightning Testing

Panels were subjected to simulated lightning strikes of the magnitude of up to 200 kilo anperes. The post-test destructive testing indicated retention of 75% of mechanical properties after testing. Damage was limited to surface fiber damage of 1.0 in$^2$ and internal delamination of 2.2 in$^2$.

Applications

While the primary application of this technology is the nose cone for the External Tank (ET), this technology would also be directly applicable to any secondary structure on new launch/boost vehicles, such as reusable launch vehicle, Titan IV, Atlas II-ES, Ariane IV, and Ariane V. This technology could also be used to replace TPS (Thermal Protection System) covered metal structure on the ET, the existing Solid Rocket Booster for the Space Shuttle, and other Launch Vehicles, such as Titan, Delta, Atlas, Ariane, RLV, etc.

Generic applications include all high temperature structural systems. In aerospace, leading edges, nose cones, nozzles, and heat shields can benefit from this technology. The new material also allows the baselining of advanced composite structure in any application where a metal substrate with secondary ablator is used. In aeronautics, applications include leading and trailing edges on high speed planes and structures. High temperature aircraft engine applications can also take advantage of the heat capability and high strength and stiffness of the material.

Extensions of the Innovation

This technology could be extended for use on nozzles of solid rocket motors. This technology could potentially eliminate the problem of "ply lift" which is currently a problem with some rocket motor cases.

Other possible extensions include structural firewalls and/or secondary structure for aircraft, spacecraft, or naval applications (phenolic laminates have historically been used for secondary structure on aircraft due to their excellent resistance to burning, and low smoke and toxic by-product generation when exposed to flame; the present invention adds retention of strength at high temperature to these advantages).

The basic processing approach could be used with virtually any fiber/resin combination to improve high temperature performance. For example, investigation of extension of the innovation for use with graphite/polyimide laminates for use on the external tank of the space shuttle is currently underway.

The basic processing technology could be extended for use with other fiber systems (such as glass or quartz - with phenolic resin or some other resin, such as cyanate ester or polyimide) and used for electrical applications such as high temperature circuit boards or electrical insulators. Furthermore, porosity induced by this method enhances insulative properties.

Unless specified otherwise, all measurements herein are at standard temperature and pressure.

The material of the present invention comprises a high performance structural laminate composite material for use in high temperature applications, consisting essentially of resin-impregnated fiber, the resin-impregnated fiber consisting essentially of:

(a) preferably 50–80% by weight fiber; and (b) preferably 20–50% by weight cured resin, the composite material having:

(c) a permeability sufficient to allow moisture to escape from the composite material, without causing plylift, when the composite material is heated to temperatures up to 1000° F. More preferably, the permeability is sufficient to allow moisture to escape from the composite material, without causing plylift, even when the composite material is heated to temperatures above 1000° F.

The material of the present invention preferably consists essentially of phenolic resin-impregnated graphite fiber, and more preferably consists of phenolic resin-impregnated graphite fiber cloth. The phenolic resin-impregnated graphite fiber cloth of the present invention preferably consists essentially of graphite fiber cloth and cured phenolic resin, and more preferably consists of graphite fiber cloth and cured phenolic resin.

Because many varying and different embodiments may be made within the scope of the inventive concept herein taught, and because many modifications may be made in the embodiments herein detailed in accordance with the descriptive requirement of the law, it is to be understood that the details herein are to be interpreted as illustrative and not in a limiting sense.

What is claimed as invention is:

1. A method of producing a composite material, comprising the steps of:
   (a) impregnating a fiber material with a resin to create a resin-impregnated fiber material;
   (b) without applying pressure, heating the resin-impregnated fiber material under vacuum at a sufficient temperature for a sufficient amount of time until the resin reaches gel stage; and
   (c) applying temperature for a sufficient period to cure the resin-impregnated fiber material, wherein:
      (I) the starting percentage by weight of fiber material, before being cured, is 30–80%;
      (II) the starting percentage by weight of resin, before being cured, is 20–70%.

2. The method of claim 1, wherein:
   the fiber material is graphite and the resin is phenolic resin.

3. The method of claim 1, wherein before step (b), the fiber material is placed in a vacuum bag apparatus for curing the fiber material through a process of applying a vacuum and heat to the fiber material, the apparatus comprising:
   (1) a base for receiving the fiber material thereon;
   (2) a non-stick layer to be received on the fiber material for helping to prevent the fiber material from sticking to layers above the non-stick layer;
   (3) a first gas-flow layer above the non-stick layer for allowing gas to flow evenly through the vacuum bag apparatus when a vacuum is drawn in the apparatus;
   (4) a lateral gas-flow layer surrounding the fiber material to ensure that volatiles can flow out of the fiber in virtually any direction;
   (5) a vacuum bag layer attached to the base in an air-tight manner, the base and the vacuum bag layer enclosing the fiber material and the non-stick layer, the first gas-flow layer, and the lateral gas-flow layer.

4. The method of claim 3, wherein the vacuum bag apparatus further comprises:
   a first volatiles flow and resin retaining layer between the non-stick layer and the first gas-flow layer for allowing volatiles, but not the majority of the resin, to escape from the fiber material through the first volatiles flow and resin retaining layer as heat is applied and the vacuum is drawn in the bag apparatus.

5. The method of claim 4, wherein the vacuum bag apparatus further comprises:
   a bleeder layer on the first volatiles flow and resin retaining layer for absorbing most of the resin which flows through the first volatiles flow and resin retaining layer.

6. The method of claim 5, wherein the vacuum bag apparatus further comprises:
   a second volatiles flow and resin retaining layer on the bleeder layer for allowing volatiles, but very little resin, to flow through the bleeder layer as heat is applied and the vacuum is drawn in the vacuum bag apparatus.

7. The method of claim 3, wherein steps (b) and (c) comprise the steps of:
   (i) placing the fiber material in a heater;
   (ii) applying full vacuum;
   (iii) raising the temperature, based on a lagging thermocouple, to about 175+5° F. in about 160+10 minutes and hold for about 60+5, −0 minutes;
   (iv) raising the temperature at about 1.0–1.5° F. per minute to about 220+10° F. based on leading part thermocouple;
   (v) holding the material at about 220° F. for about an additional 36 minutes;
   (vi) at about 1.0–1.5° F. per minute, raising the temperature to about 240+5° F. based on lagging part thermocouple and holding for about 30+5 minutes;
   (vii) at about 1.0–1.5° F. per minute, raising the temperature to about 350+5° F. based on lagging part thermocouple and holding for about 60+5 minutes;
   (viii) cooling the material at about 1–4° F. per minute to about 150° F. or below;
   (ix) removing the fiber material from the heater and leaving the fiber material under vacuum until the fiber material reaches about 100° F. or below;
   (x) post-curing the fiber material removed from the heater, as follows:
      (A) at about 3–5° F. per minute, raising the temperature of the fiber material to about 250+10° F. and hold for about 2+1 hrs;
      (B) at about 3–5° F. per minute, raising the temperature of the fiber material to about 350+10° F. and holding for about 24+1 hrs;
      (C) at about 1–3° F. per minute, raising the temperature of the fiber material to about 415+10° F. and hold for about 16+1 hrs;
      (D) at 1–5° F. per minute, cooling the fiber material to room temperature.

8. The method of claim 1, wherein steps (b) and (c) comprise the steps of:
   (i) placing the fiber material in a heater;
   (ii) applying full vacuum;
   (iii) raising the temperature, based on a lagging thermocouple, to about 175+5° F. in about 160+10 minutes and hold for about 60+5, −0 minutes;
   (iv) raising the temperature at about 1.0–1.5° F. per minute to about 220+10° F. based on leading part thermocouple;
   (v) holding the material at about 220° F. for about an additional 36 minutes;
   (vi) at about 1.0–1.5° F. per minute, raising the temperature to about 240+5° F. based on lagging part thermocouple and holding for about 30+5 minutes;
   (vii) at about 1.0–1.5° F. per minute, raising the temperature to about 350+5° F. based on lagging part thermocouple and holding for about 60+5 minutes;
   (viii) cooling the material at about 1–4° F. per minute to about 150° F. or below;
   (ix) removing the fiber material from the heater and leaving the fiber material under vacuum until the fiber material reaches about 100° F. or below;

(x) post-curing the fiber material removed from the heater, as follows:
  (A) at about 3–5° F. per minute, raising the temperature of the fiber material to about 250+10° F. and hold for about 2+1 hrs;
  (B) at about 3–5° F. per minute, raising the temperature of the fiber material to about 350+10° F. and holding for about 24+1 hrs;
  (C) at about 1–3° F. per minute, raising the temperature of the fiber material to about 415+10° F. and hold for about 16+1 hrs;
  (D) at 1–5° F. per minute, cooling the fiber material to room temperature.

9. The method of claim 1, wherein:

the composite material has a porosity of at least 2% by volume.

10. The method of claim 1, wherein:

the composite material has a porosity of about 3–25% by volume.

11. The method of claim 1, wherein:

the composite material has an across-ply permeability having a Darcy's constant of at least $10^{-15}$ cm$^2$.

* * * * *